United States Patent [19]
Dangat et al.

[11] Patent Number: 5,971,585
[45] Date of Patent: Oct. 26, 1999

[54] BEST CAN DO MATCHING OF ASSETS WITH DEMAND IN MICROELECTRONICS MANUFACTURING

[75] Inventors: Geetaram S. Dangat, Naperville, Ill.; Anand R. Gokhale, Danbury, Conn.; Shuchen Li, Poughkeepsie, N.Y.; Robert J. Milne, Jericho; Robert A. Orzell, Essex Junction, both of Vt.; Robert L. Reid, Austin, Tex.; Xueqing Tang, Naperville, Ill.; Chih-Kuan Yen, Ann Arbor, Mich.

[73] Assignee: International Business Machines Corporation, Armonk, N.Y.

[21] Appl. No.: 08/926,131

[22] Filed: Sep. 9, 1997

[51] Int. Cl.[6] .............................. G06F 19/00; G06G 7/66
[52] U.S. Cl. ............................. 364/468.08; 364/468.03; 364/468.05; 364/468.06; 364/468.08
[58] Field of Search ..................... 364/468.01, 468.03, 364/468.05, 468.08, 468.06

[56] References Cited

U.S. PATENT DOCUMENTS

| | | |
|---|---|---|
| 4,866,628 | 9/1989 | Natarajan . |
| 4,887,218 | 12/1989 | Natarajan . |
| 5,479,343 | 12/1995 | Matoba et al. . |
| 5,548,518 | 8/1996 | Dietrich et al. . |
| 5,787,000 | 7/1998 | Lilly et al. .......................... 364/468.01 |
| 5,796,614 | 8/1998 | Yamada ............................. 364/468.13 |

OTHER PUBLICATIONS

Duchessi, P. and O'Keefe, R., "A Knowledge Based Approach to Production Planning," *Journal of Operations Research*, vol. 41, No. 5, pp. 377–390 (1990).

Leachman, R., "Modeling Techniques for Automated Production Planning in the Semiconductor Industry," *Optimization in Industry*, John Wiley & Sons (1993).

*Primary Examiner*—William Grant
*Assistant Examiner*—Peter W. Eissmann
*Attorney, Agent, or Firm*—Whitham, Curtis & Whitham; Richard M. Kortulak

[57] ABSTRACT

A computer implemented decision support tool serves as a solver to generate a best can do (BCD) match between existing assets and demands across multiple manufacturing facilities within boundaries established by manufacturing specifications and process flows and business policies to determine which demands can be met in what time frame by microelectronics (wafer to card) or related (for example disk drives) manufacturing and establishes a set of actions or guidelines for manufacturing to incorporate into their manufacturing execution system to insure the delivery commitments are met in a timely fashion. The BCD tool has six major components, a material resource planning explode or "backwards" component, an optional STARTS evaluator component, an optional due date for receipts evaluator, an optional capacity available versus needed component, an implode "forward" or feasible plan component, and a post processing algorithm.

19 Claims, 14 Drawing Sheets

BEST CAN DO MATCHING OF ASSETS WITH DEMAND IN MICROELECTRONICS MANUFACTURING

BACKGROUND OF THE INVENTION

1. Field of the Invention

The present invention generally relates to computer implemented planning resources and decision support tools and, more particularly, to a tool in which core production planning information is provided to a solver which generates a best can do (BCD) match between assets and demands. The invention generates a BCD match between existing assets and demands across multiple manufacturing facilities within boundaries established by manufacturing specifications and process flows and business policies to determine which demands can be met in what time frame by microelectronics (wafer to card) or related (for example disk drives) manufacturing and establishes a set of actions or guidelines for manufacturing to incorporate into their Manufacturing Execution System to insure the delivery commitments are met in a timely fashion.

2. Background Description

Within the complexity of microelectronics and related manufacturing, four related decision areas or tiers can be distinguished based on the time scale of the planning horizon and the apparent width of the opportunity window. To facilitate an understanding of the four decision tiers in semiconductor manufacturing, consider the following oven example, with reference to FIG. 1 which is a diagram associated with this example.

Within a zone of control 10, there is a coater machine 12, a work-in-progress (WIP) queue 14, and an oven set 16. Wafers move around the zone of control in groups of twenty-five, called a lot. All wafers in the lot are the same type. Each lot must pass through the oven operation ten times. Each oven set is composed of four ovens or tubes 161, 162, 163, and 164 and one robot 166 to load and unload the oven. It takes about ten minutes to load or unload an oven. The process time in the oven depends on the iteration. We will assume one lot to an oven at a time. Before a wafer enters into the oven, it must be coated by the coater machine 12. The coating process takes twenty minutes. The coating expires in four hours. If the coating expires, the wafer must be stripped, cleaned, and then recoated. This process takes four hours and often generates yield losses.

The first decision tier, strategic scheduling, is driven by the time frame or lead time required for the business plan, resource acquisition, and new product introduction. This tier can often be viewed in two parts; very long-term and long-term. Here, decision makers are concerned with a set of problems that are three months to seven years into the future. Issues considered include, but are not limited to, what markets they will be in, general availability of tooling and workers, major changes in processes, changes in or risk assessment of demand for existing product, required or expected incremental improvements in the production process, lead times for additional tooling, manpower and planning. In the oven example of FIG. 1, very-long-term decisions are made on whether the ovens are necessary to the production process, and if so the characteristics needed in the ovens. Long-term decisions are made about how many ovens to buy. Tools typically used in planning of this scope are models for capacity planning, cost/pricing, investment optimization, and simulations of key business measures.

The second tier, tactical scheduling, deals with problems the company faces in the next week to six months. Estimates are made of yields, cycle times, and binning percentages. Permissible substitutions are identified. Decisions are made about scheduling starts or releases into the manufacturing line (committing available capacity to new starts). Delivery dates are estimated for firm orders, available "outs" by time buckets are estimated for bulk products, and daily going rates for schedule driven product are set. The order/release plan is generated/regenerated. Reschedules are negotiated with or requested by the ultimate customer. In the oven example of FIG. 1, typical decision areas would include the daily going rate for different products, the allocation of resources between operations, the number of operators to assign, and machine dedication. Tools typically used in the planning and scheduling of this phase are forward schedulers, fast capacity checkers, and optimization of capacity, commits and cost.

The third tier, operational scheduling, deals with the execution and achievement of a weekly plan. Shipments are made. Serviceability levels are measured. Recovery actions are taken. Optimized consumption of capacity and output of product computed. Tools typically used in support of daily activities are decision support, recovery models, prioritization techniques and deterministic forward schedulers. Manufacturing Execution Systems (MES) are used for floor communications and control. In the oven example of FIG. 1, priorities would be placed on each lot arriving at the ovens based on their relevance to the current plan or record. If the ovens "go down", their priority in the repair queue would be set by decisions made in this tier.

The fourth tier, dispatch scheduling or response system, addresses the problems of the next hour to a few weeks by responding to conditions as they emerge in real time and accommodate variances from availability assumed by systems in the plan creation and commitment phases. Essentially, they instruct the operator what to do next to achieve the current goals of manufacturing. Dispatch scheduling decisions concern monitoring and controlling of the actual manufacturing flow or logistics. Here, decisions are made concerning trade-offs between running test lots for a change in an existing product or a new product and running regular manufacturing lots, lot expiration, prioritizing late lots, positioning preventive maintenance downtime, production of similar products to reduce setup time, downstream needs, simultaneous requests on the same piece of equipment, preferred machines for yield considerations, assigning personnel to machines, covering for absences, and reestablishing steady production flow after a machine has been down. In the oven example, the question should be which lot (if any) should be run next when an oven is free. Tools used are rule based dispatchers, short interval schedulers and mechanical work-in-progress (WIP) limiting constructions.

Of course, there is overlap and interaction between the four decision tiers, but typically different groups are responsible for different scheduling decisions. For example, maintenance may decide on training for their personnel, on work schedules for their people, preventive maintenance, and which machine to repair next. Finance and each building superintendent may make decisions on capital equipment purchases. Industrial Engineering may have the final say on total manpower, but a building superintendent may do the day-to-day scheduling. Marketing may decide when orders for products can be filled and what schedule commitments to make. For strategic and operational decisions, these groups and their associated decision support tools are loosely coordinated or coupled. Finance only requires an estimate of required new tools from each building to estimate capital purchase. Each building requires an estimate on new tool requirements from the product development people. Dispatch decisions must be tightly coupled. Lots only get processed when the appropriate tool, operator, and raw material are available. At dispatch rough estimates are no longer sufficient. If a machine is down maintenance must have the appropriately trained individual available to repair the machine. Manufacturing must have the appropriate mix of tools and workers to produce finished goods on a timely basis. At dispatch the decisions made by various groups must be in synchronization or nothing is produced. A manufacturing facility accommodates this tight coupling in only one of two ways; slack (extra tooling and manpower, long lead times, limited product variation, excess inventory and people, differential quality, brand loyalty, and so forth) or strong information systems to make effective decisions.

Within the second and third decision tiers, a major planning activity undertaken by microelectronic firms is matching assets with demands. This activity can be broken into three major types of matching that are used throughout Microelectronics to support decision making:

(a) Materials Requirements Planning (MRP) type of matching— "Opportunity Identification" or "Wish list". For a given set of demand and a given asset profile what work needs to be accomplished to meet the demand.

(b) Projected or Estimated Supply Plan (PSP/ESP). Given a set of assets, manufacturing specifications, and business guidelines this application creates an expected or projected supply picture over the next "t" time units. The user supplied guidelines to direct how to flow or flush assets "forward" to some inventory or holding point.

(c) Best Can Do (BCD). Given the current manufacturing condition and a prioritized set of demands which demands can be met in what time frame. BCD generally refers to a large set of demands.

Arguably, the oldest type of matching is Material Requirements Planning (MRP). MRP is a system for translating demand for final products into specific raw material and manufacturing activity requirements by exploding demand backwards through the bill of material (BOM) and assets. Many authors have published papers and books on MRP. For example, Joseph Orlickly wrote *Material Requirements Planning*, published by McGraw-Hill, which has become a standard reference. As practiced in the microelectronics industry, MRP systems operate at a specific part number and inventory holding point level of detail.

The difficulty with traditional MRP is it does not provide an estimate about which demand will be met if insufficient resources are available and secondly how to prioritize manufacturing activity in light of insufficient resources. Therefore, it does not directly meet the business requirement filled by BCD. To overcome these limitations and answer the core BCD question, support tools were developed and added to MRP to examine the output of the MRP solution to help the user identify resource constraints, shift schedules to better utilize resources, and make limited suggestions on how to alter demand. These systems are often called extended MRP or MRP II. Historically, these tools have not evolved beyond the what-if stage and require much human intervention to create an intelligent feasible plan. The size and complexity the BCD question in semiconductor and microelectronics manufacturing have made the "add on" tools for MRP very limited in their effectiveness.

Additionally, traditional MRP logic does not adequately handle binned parts. Multiple integrated circuit chips, such as microprocessors, are manufactured on a single semiconductor wafer and separated into individual chips by dicing the wafer. Although all the chips are manufactured on a single wafer, testing each chip will reveal that there are variances in the performances of the chips. Assume that the microprocessors are designed for a particular clock speed, say 200 MHz. However, testing the chips shows that there is only a 50% yield of chips meeting this criteria. Of the remaining 50% of the chips, some may perform at a slower but still fast clock speed, say 175 MHz, and others at a still slower clock speed, say 150 Mhz. Traditional MRP vastly over state the required wafer starts needed to meet demand in binning situations. However, for some time an optimization model has been known which minimizes wafer starts in binning situations. Traditionally, this optimization was used in a stand alone form or within another optimization routine. The binning optimization model has not been used within an MRP designed to support BCD.

Within the semiconductor industry, a type of matching called projected supply planning was developed to partially meet the BCD business requirement. This matching uses aggregated production specification information and simple algorithms to generate a feasible supply plan. Again, this matching has clear limitations in its effectiveness to meet the BCD requirement.

During the past ten years, a variety of attempts have been made to apply Linear Programming (LP) decision technology in stand alone mode to directly support the BCD requirement in the semiconductor and microelectronics industry. This work suffered two major deficiencies. First, it operated as a black box assigning due dates to demands disconnected from the MRP approach, and therefore it failed to provide users an easy path to understand what was needed to meet demands. Since the parameters such as cycle times, yields, due dates for receipts, etc. are estimates, a good planner can identify places where manufacturing performance can be improved if required to meet important demands. Second, the LP structures failed to deal with critical decision trade-offs (such as demand class) common in the semiconductor industry and forced it to solve only subsets of the BCD matching question.

During the past five years, a few simple heuristic approaches have been developed to replace the LP based solver in generating a BCD black box answer. These approaches suffered the same deficiencies as the LP solution in failing to be connected to the MRP approach and simplifying the model structure relative to the complex flows in semiconductor manufacturing.

Additionally, most providers of the direct black box BCD tools either provided an LP approach or a heuristic approach. A few provided access to both, but in a disconnected manner. They did not attempt to harness the powerful synergy between the two.

SUMMARY OF THE INVENTION

It is therefore an object of the invention to provide a computer implemented decision support tool serving as a solver to generate a best can do (BCD) match between existing assets and demands across multiple manufacturing facilities.

It is another object of the invention to provide the BCD match across multiple manufacturing facilities within boundaries established by manufacturing specifications and process flows and business policies to determine which demands can be met in what time frame and establish a set of actions or guidelines for manufacturing to incorporate into their manufacturing execution system to insure delivery commitments are met in a timely fashion.

It is a further object of the invention to create a synergy between three distinct decision technologies (MRP, LP, and heuristic) to create a superior solution to the BCD matching requirement.

It is yet another object of this invention to permit the user to plug and play the components of the BCD tool that are required for his or her business situation.

It is still another object of this invention to provide a BCD explode of the MRP component which has special logic to (a) avoid over building binned parts and therefore minimize the number of starts required, (b) provide initial capacity checking for requested manufacturing starts, and (c) keep the demand class associated with the independent demand with each lot sized manufacturing start identified as necessary.

Demand class is a numerical value assigned to each independent demand to indicate its relative priority to other demands. Item (c) results in a set of clues for the heuristic implode component so it may give pre-emptive priority to orders with more important demand classes.

It is another object of this invention to permit the user to modify the required STARTS file created from the BCD explode component either manually or under program control prior to its use as an input file to the implode component.

It is a further object of this invention to permit the user to modify the RECEIPTS file based on the need date file created from the BCD explode component either manually or under program control prior to its use as an input file to the implode component.

It is yet another object of this invention to permit the user to modify the CAPACITY AVAILABLE file based on the capacity required file created from the BCD explode component either manually or under program control prior to its use as an input file to the implode component.

It is still another object of this invention to provide BCD implode which handle individual orders (demands) and multiple demand classes indicating the relative demand priority.

It is another object of this invention to provide a BCD implode component which controls substitution at the customer level.

It is yet another object of this invention to provide a BCD implode component which handles individual orders (demands) and multiple demand classes.

It is still another object of this invention to provide a BCD implode component which provides the user control over sourcing between manufacturing and distribution locations.

It is another object of this invention to provide an LP based BCD implode solver which handles variable length time buckets as its core unit of time, permits the user to turn on and off production splitting, and appropriately adjusts the objective function to control for overbuilding and late delivery that can be an unwanted side effect of time buckets.

It is a further object of this invention to provide an LP based BCD solver which handles fixed ratio of production starts.

It is yet another object of this invention to provide an LP based BCD solver which can handle STARTS in two ways: (1) As an item to be calculated. (2) As a fixed asset specification in the input stream over a fixed period of time.

It is still another object of this invention to provide an LP based BCD solver which provides the user the ability to make trade-offs in on-time delivery between classes of demand.

It is another object of this invention to provide a heuristic implode component which will adjust the inputted starts to be time and capacity feasible, implode the starts and WIP forward giving priority to more important demands as established by the demand class assigned to each order, and insure the solution is capacity feasible.

It is still another object of the invention to provide a superior supply chain analysis solution explanation feature to insure the user has a complete picture of the interlocking commitments by converting the BCD solution into a "pegging" report format.

Assets include, but are not limited to, planned STARTS (starts at the lowest level of the BOM), WIP (work in progress), inventory, purchases, and capacity (tooling and manpower). Demands include, but are not limited to, firm orders, forecasted orders, and inventory buffer. The matching must take into account manufacturing specifications and business guidelines. Manufacturing specifications and process flows include, but are not limited to, build options, BOM (bill of material), yields, cycle times, receipt dates, capacity consumed, capacity available, substitutions (allowable substitutions), binning or sorting, and shipping times. Business guidelines include, but are not limited to, frozen zones, demand priorities, priority trade-offs, preferred suppliers, and inventory policy. Build options, BOM, yields, cycle times, capacity, allowable substitutions, binning, inventory policy, and supplier preferences are date effective.

The BCD solver according to the invention is the first to provide BCD planners the ability to harness the powerful synergy that can occur by integrating the MRP approach with two direct BCD approaches; one heuristic and one LP. Additionally, it is the first to harness the synergy between an LP solver and a heuristic solver, deploy an LP solver with key enhancements over prior art to adequately represent the complex flows and trade-offs in semiconductor manufacturing, provide a heuristic solver that has a synergistic relationship with the MRP approach, and provide a companion MRP with an imbedded optimization routine to properly handle binned parts and avoid overstating required STARTS (manufacturing activity at the lowest level of the BOM).

The core business function supported by this invention is generating a Best Can Do (BCD) match between existing assets and demands across multiple manufacturing facilities within the boundaries established by the manufacturing specifications and process flows and business policies to determine which demands can be met in what time frame by microelectronics (wafer to card) or related (for example disk drives) manufacturing and establishes a set of actions or guidelines for manufacturing to incorporate into their Manufacturing Execution System to insure the delivery commitments are met in a timely fashion. The business function of matching assets with demands falls into decisions of the second and third tiers described earlier. The invention is the tool which serves as the solver to create the BCD match.

The preferred embodiment of the invention has six major components: (a) A Material Requirements Planning, explode, or "backwards" component which works backwards from demand through the BOM to establish requirements to meet demand (starts, due dates for receipts, and capacity), minimizes the required starts at the binning operations, and establishes clues for its heuristic implode or forward companion. (b) An optional STARTS evaluator component which examines the required STARTS and establishes an actual STARTS profile to be used by the implode or forward component. STARTS refers to the production activity required to create a part at the "bottom"

of the BOM. That is those parts which do not call out another part that is produced by a manufacturing activity. Within the semiconductor manufacturing process this is usually a wafer start. (c) An optional due date for receipts evaluator which examines the differences between current projected dates for receipts and the required date for receipts and establishes a receipts date profile to be used by the implode component. (d) An optional capacity available versus needed activity which examines the differences between current capacity available and the required capacity and establishes a capacity available to be used by the implode component. (e) An implode, "forward", or feasible plan component which generates the best can do match between assets and demands. There are two implode or forward solvers available for the user of the tool. The first one is based on linear programming decision technology. The second one is based on heuristic decision technology. (f) A post processing algorithm which generates a pegging or supply chain analysis report.

The ability of the BCD tool to handle all of the complexities of microelectronics (wafer to card) and related (for example disk drives) manufacturing processes, the synergy between the six components, and the user's ability to choose between the LP based implode solver and the heuristic based implode solver insures each manufacturing entity can configure the tool to best meet their requirements.

The BCD tool resides within a data provider tool that pulls the required production and distribution information (manufacturing specifications, asset status, and business policy from various legacy systems and stores them in the required format).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
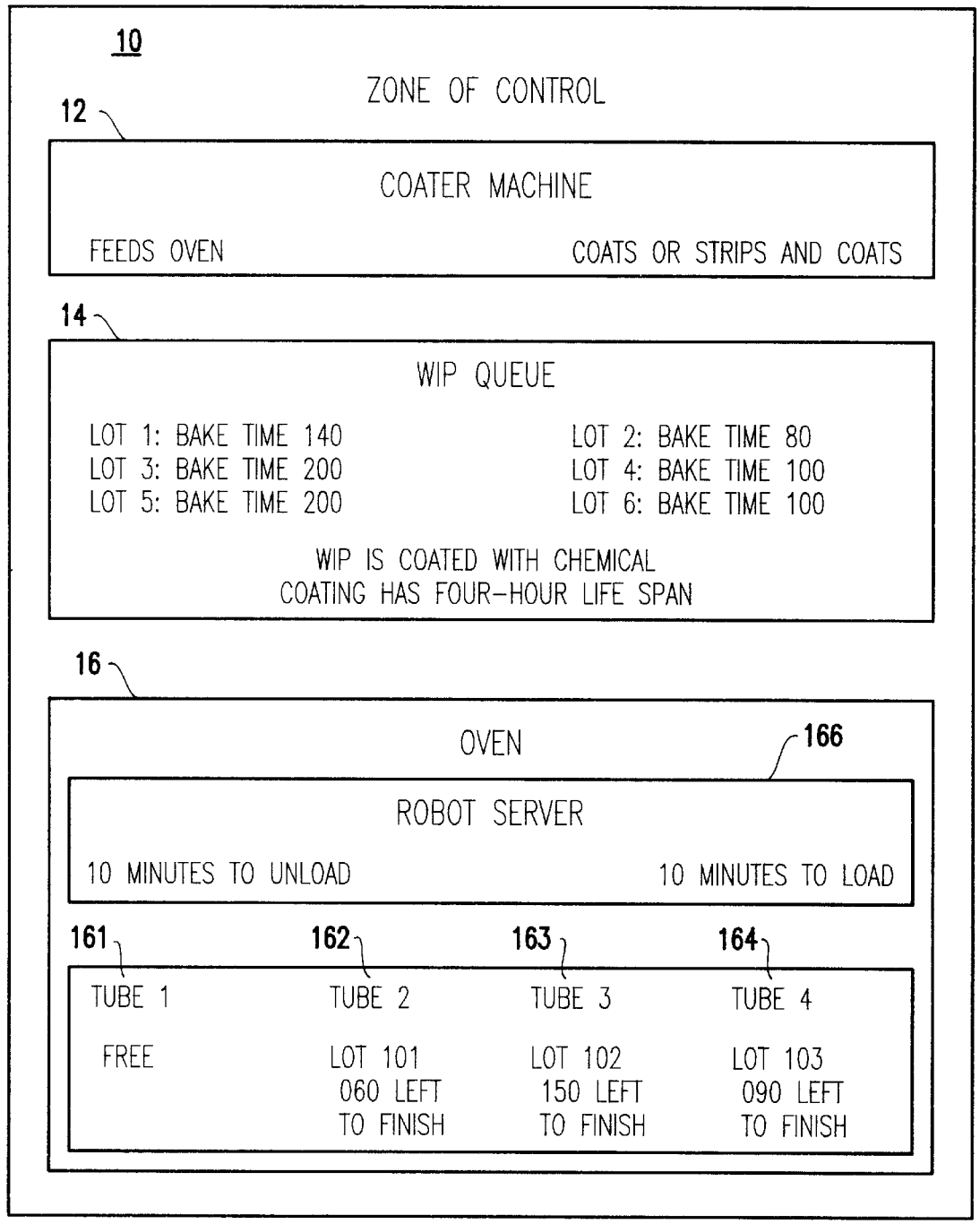
FIG. 1 is block diagram of an oven dispatch example used to illustrate decision areas or tiers based on a planning horizon.
Figure 2:
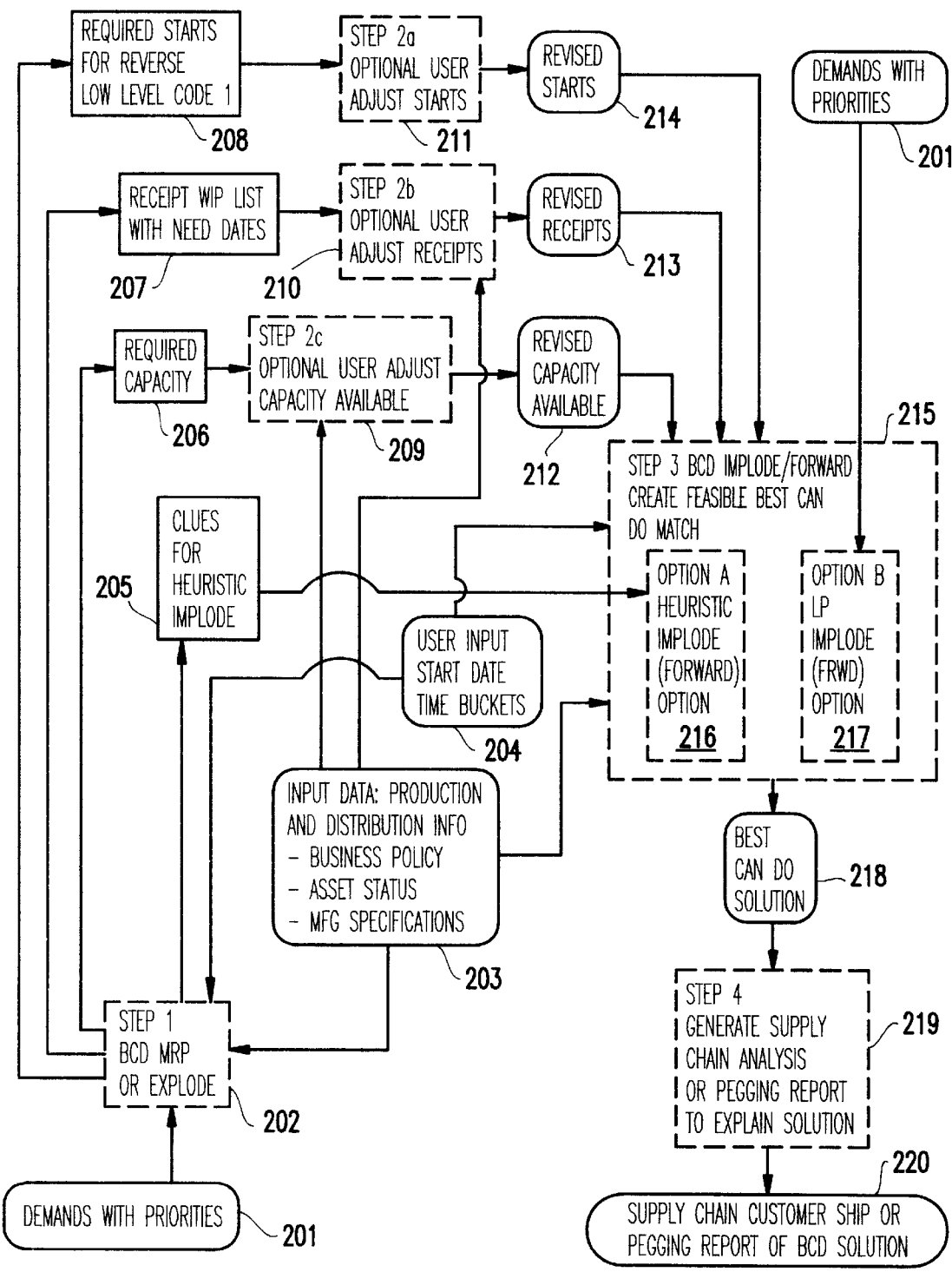
FIG. 2 is a flow diagram showing the overall organization of the best can do (BCD) matching decision support tool according to the preferred embodiment of the invention.

Referring again to the drawings, and more particularly to FIG. 2, there is shown a flow diagram of the overall logical organization and process flow of the best can do (BCD) asset and demand matching decision support tool according to a preferred embodiment of the invention. This tool has been implemented to run on a 16-WAY IBM SP2 machine with AFS for storage. The SP2 is a collection IBM RS6000 engines running under a common umbrella and AIX operating system (IBM's version of the UNIX operating system) and connected with a high speed switch. It could be implemented on other hardware platforms including, but not limited to, mini computers, stand alone UNIX or Windows NT work stations, or workstations in a network, or mainframes, including IBM AS400 and ES9000 computers.

There are three major stages in the BCD matching engine. Stage 1(including blocks 201, 202, 203, 204, 205, 206, 207, and 208)"explode" or "backward" flow of activity. In this stage, a STARTS file, a due date for receipts file, a required capacity file, and set of "clues" for the implode stage are created by the MRP component of the BCD engine. Stage 2 (including blocks 206, 207, 208, 209, 210, 211, 212, 213, and 214) permit the user to adjust or modify the STARTS file and/or receipts file and/or capacity available file either manually or by invoking another computer program. At the completion of this stage a "final" receipts, starts, and capacity available file is available for Stage 3. Stage 3 (including blocks 201, 203, 204, 205, 212, 213, 214, 215, 216, 217, 218, 219, and 220) is the "implode" or "forward" flow or activity. In this stage, an intelligently feasible matching is completed between demands and assets and a best can do answer is provided. The user has two implode engines to select from. One is based on Linear Programming (LP) decision technology, and the second is based on heuristic decision technology. The "pegging" or supply chain analysis component converts the solution into a pegging report that explains the solution and has a look and feel with which production planning people are familiar.

The overall flow begins with requested demands in block 201. The requested demands includes the customer identification, type of part, quantity, date, and priority. The core production planning input data at block 203 includes the status of the assets and the production and distribution specification information. The demand statement from block 201 together with core production planning information from block 203 is input to the explode or MRP component of BCD engine at block 202 to execute step 1 of the BCD process called the "explode" or backwards step. Besides executing traditional MRP logic to determine recommended starts, new purchases, required capacity at block 206, and need dates at block 207 for receipts or WIP, this MRP 202 has special logic to (a) avoid over building at binned parts, (b) initial capacity checking for requested manufacturing starts, (c) keeps the demand class associated with the independent demand input at block 201 with each lot sized manufacturing start identified as necessary, (d) creation of a STARTS file at block 208 for parts that have no further bill of material (reverse low level code of 1—often wafer starts in semiconductor manufacturing), and (e) establishes clues output at block 205 for the heuristic implode or forward engine. In step 1, the MRP component of BCD moves backwards through the production specification files (BOM, binning, shipping, etc.) and asset files (inventory and WIP or receipts) to calculate exploded, interplant transfer, and substitution demand and total demand on every part number/location necessary to support the demands stated in block 201.

Figure 3:
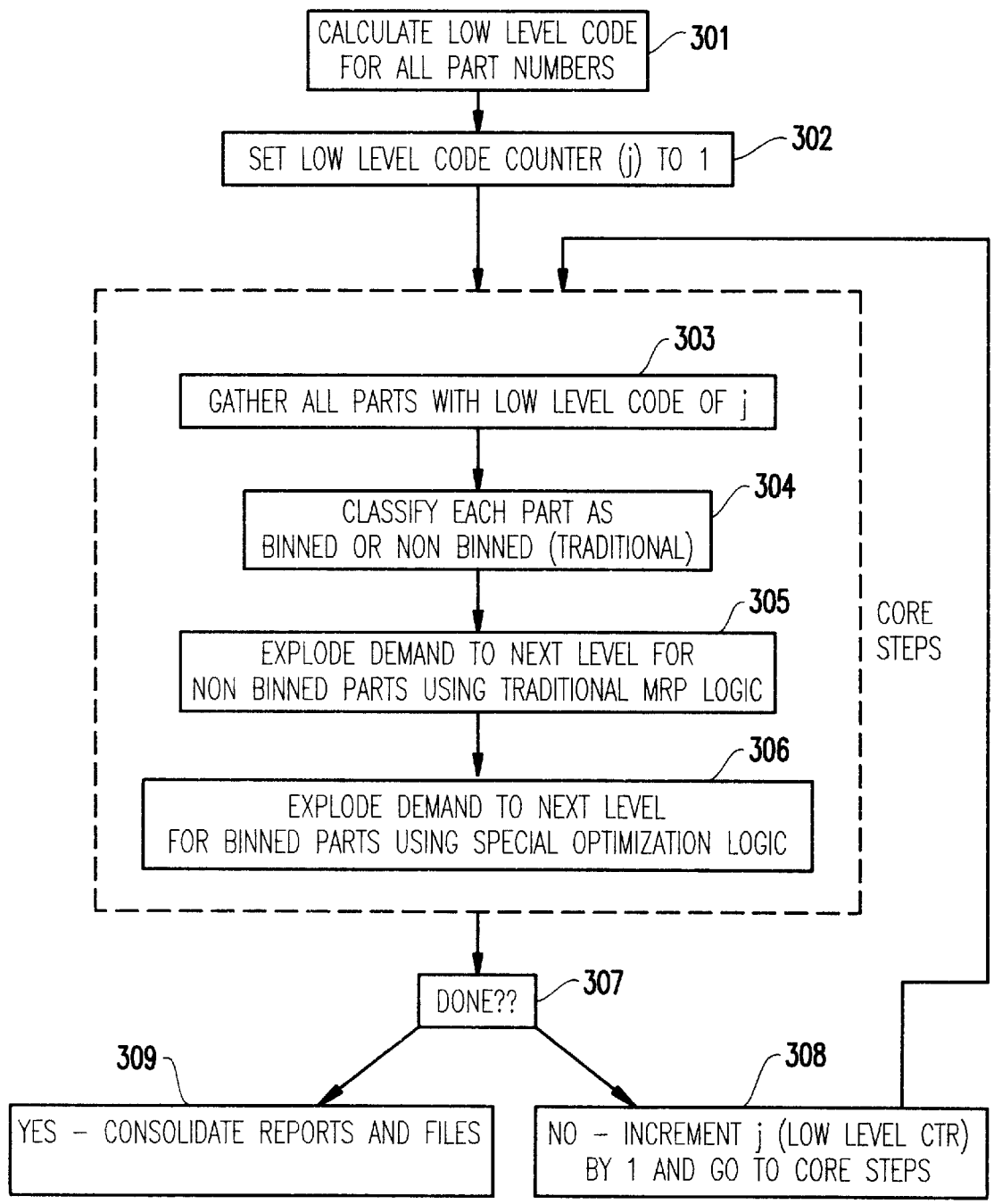
FIG. 3 is a flow diagram of the overall flow of the MRP or explode component of the BCD tool.

FIG. 3 contains an overview of the flow of the MRP component of the BCD tool. The process begins by calculating the low level code for all part numbers in block 301. Before entering the processing loop, a low level code counter (j) is set to one in block 302. Within the processing loop, all parts with a low level code of j are gathered in block 303. Each part is classified as binned or non-binned in block 304. Demand is exploded to the next level for non-binned parts using traditional MRP logic in block 305 and exploded to the next level for binned parts using special optimization logic in block 306. The process loop is iterated by checking in block 307 to determine if all parts have been processed and, if not, incrementing the counter (j) by one in block 308 before looping back to block 303. When all parts have been processed, reports and files are consolidated in block 309.

This MRP component uses traditional logic well known to anyone practiced in the art of moving backwards through the BOM according to low level code. However, it has one path for "binned" parts and one path for non-binned or traditional parts. The MRP component of the BCD employs special optimization logic to handle the complexity generated by binning and avoid massive over-statement of starts required. The core logic is a subset of the material balance linear programming formulation described later in this document and is known to those practiced in the art. The production specification files have the information required to distinguish between binned and non-binned parts.

Figure 4:
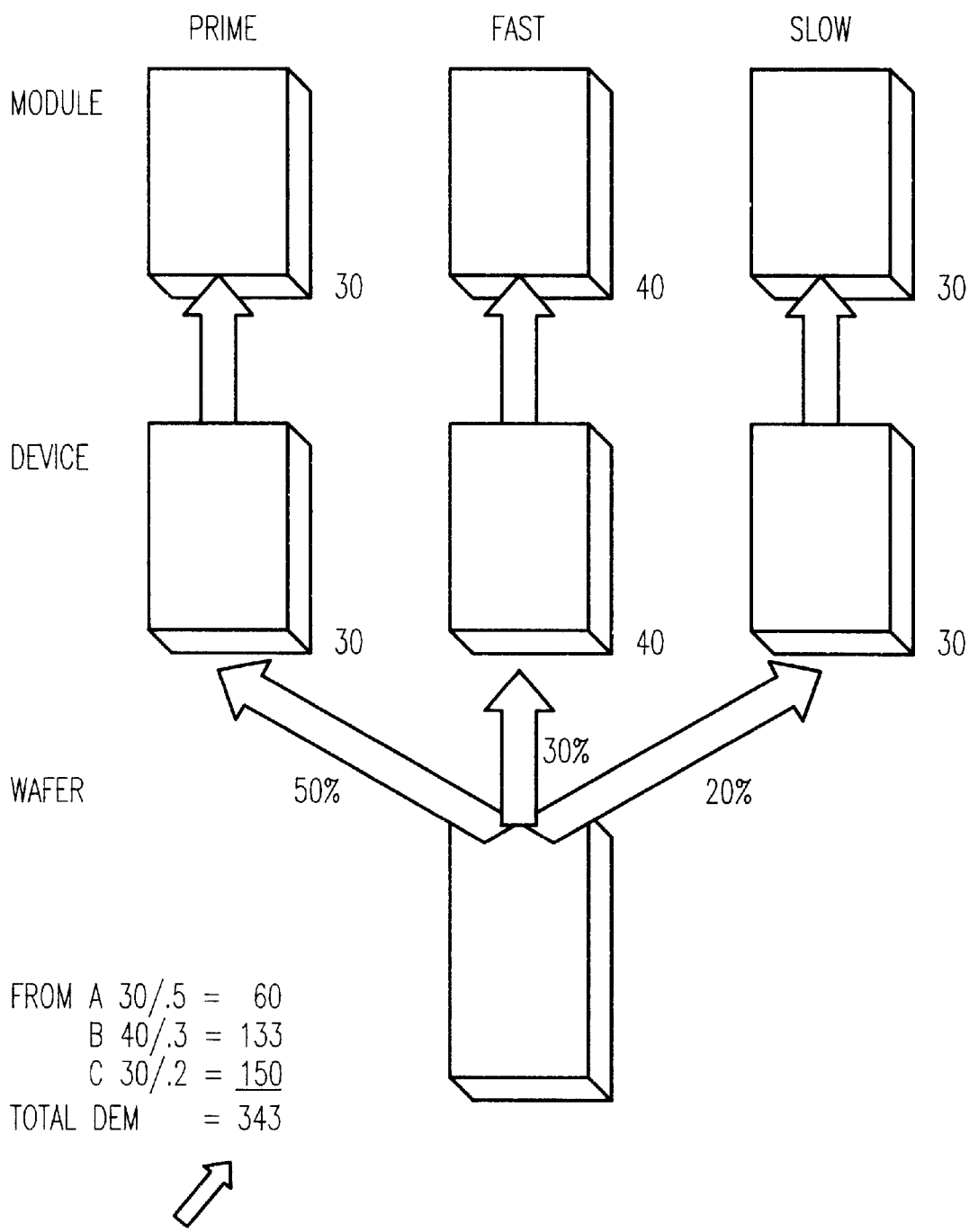
FIG. 4 is a block diagram showing the principles of traditional Materials Resource Planning (MRP) as applied to the binning portion of semiconductor manufacturing.

Reference is made to FIG. 4 to illustrate the problems of applying standard MRP logic to the binning, downgrading, and sorting product flow feature of semiconductor manufacturing and the requirement for special logic. Multiple integrated circuit chips, such as microprocessors, are manufactured on a single semiconductor wafer and separated into individual chips by dicing the wafer. Although all the chips are manufactured on a single wafer, testing each chip will reveal that there are variances in the performances of the chips. Assume that the microprocessors are designed for a particular clock speed, say 200 MHz. However, testing the chips shows that there is only a 50% yield of chips meeting this criteria. Of the remaining 50% of the chips, some may perform at a slower but still fast clock speed, say 175 MHz, and others at a still slower clock speed, say 150 MHz. In the example illustrated, there is a 30% yield of chips which will operate at the fast clock speed but not the fastest or "prime", clock speed, and there is a 20% yield of chips which will operate at the slow clock speed. Therefore, if thirty "prime" clock speed microprocessors are needed for product output, then at least sixty microprocessors will need to be manufactured with a 50% yield. If forty of the fast microprocessors are needed, then one hundred thirty-three will have to be manufactured with a 30% yield, and if thirty of the slow microprocessors are needed, then one hundred fifty will have to be manufactured with a 20% yield. Thus, under the standard MRP model a total of three hundred forty-three chips would have to be made to meet this hypothetical demand.

Clearly, economies can be realized by taking into account that if the maximum number of chips required for product with the highest demand (adjusted for yield) are manufactured, there will be sufficient numbers of co-product chips to meet the demands for those requirements as well. In the example illustrated in FIG. 4, the maximum number of the product demands (adjusted for yield) is one hundred fifty. Thus, instead of manufacturing three hundred forty-three chips, only one hundred fifty chips would be manufactured.

Further economies can be realized by recognizing some chips can be substituted for other chips to meet their demand. In our example a PRIME chip can be used to meet the demand for either a fast or slow chip. A FAST chip can be used to meet the demand for a slow chip.

Figure 5:
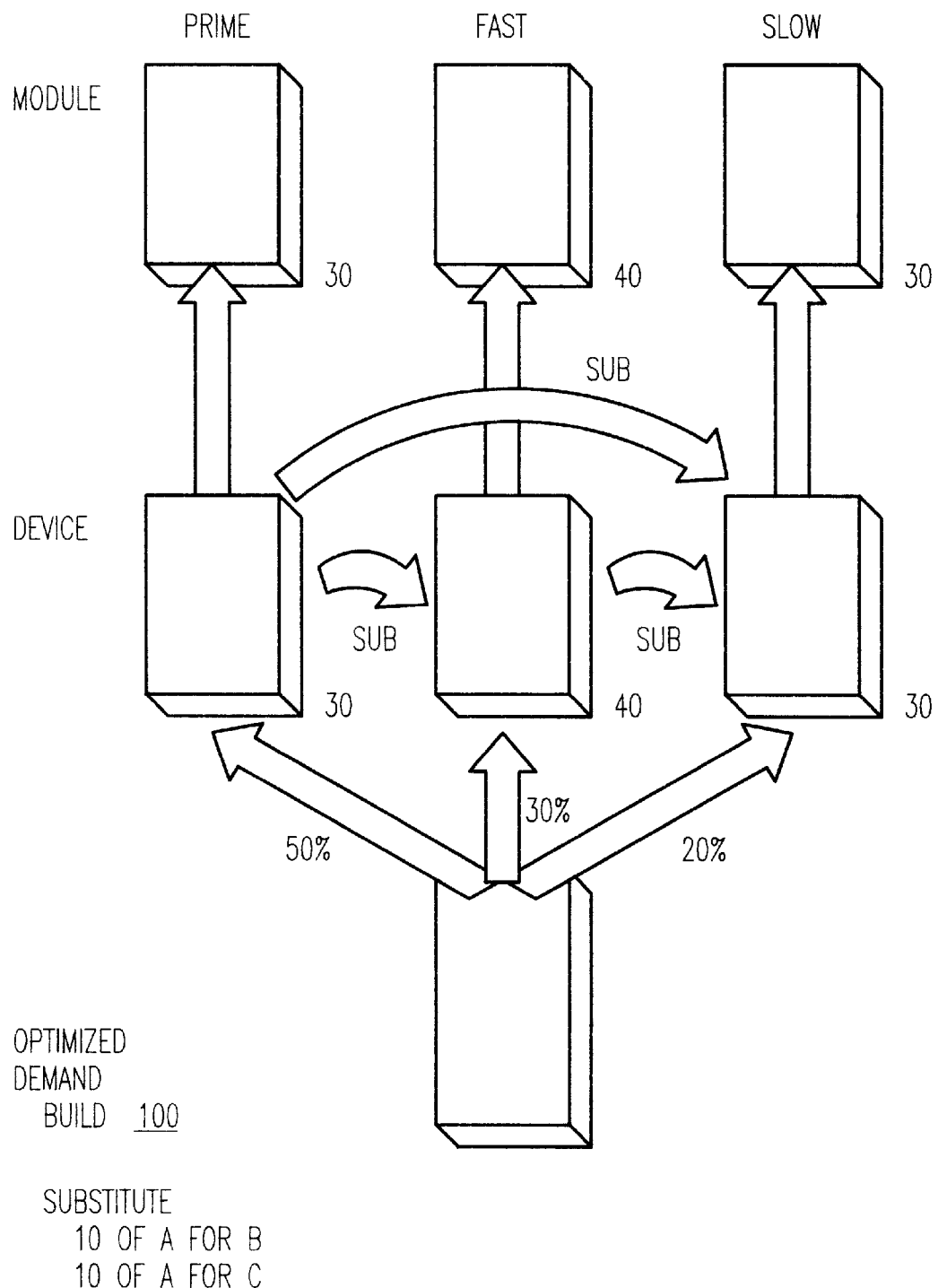
FIG. 5 is a block diagram showing the principles of the logic within the MRP component of BCD to optimally handle the binning situation.

The present invention implements an advanced optimization feature to identify both economies across time dynamically and therefore reduce the calculated starts. This is illustrated in FIG. 5. Here, the same assumptions apply, but only one hundred chips are built, rather than the three hundred forty-three in the traditional MRP and one hundred fifty required in the modified MRP. A 50% yield for the "prime" microprocessors will provide fifty microprocessors which will run at the highest clock speed. But only thirty are required in the demand example, so there are twenty extra microprocessors which meet or exceed the requirements for the fast and slow microprocessor demands. A 30% yield of the fast microprocessors produces only thirty microprocessors where forty are needed. Therefore, ten of the extra prime microprocessors are added to the thirty fast microprocessors to meet the demand. Similarly, a 20% yield of the slow microprocessors produces only twenty where thirty are needed. Again, ten of the extra prime microprocessors are added to the twenty slow microprocessors to meet that demand.

A second advanced feature of the MRP component of the BCD engine is initial capacity checking. When each start is calculated capacity is checked. If capacity is exceeded, the START (request for a manufacturing activity to begin to create a part and its co-products if appropriate) will be moved and or split to fit capacity by moving earlier in time if possible.

The third advanced feature is propagating the initial demand class associated with each independent demand through each level of the explode process. Demand class is a numerical value assigned to each independent demand to indicate its relative priority to other demands. Each demand or propagated demand is kept as its own individual record which has the lot sized quantity required and the associated or inherited demand class. Demands are not aggregated during the explode process.

Returning to FIG. 2, the four fundamental "clues" of block 205 the MRP creates to help the heuristic implode engine are:

(a) A detailed list of all starts required for each part number that includes lot size, date, components to consume, and most importantly the demand class for each start. Demand class establishes the relative priority or importance of the starts.

(b) Insures there is only one demand class associated with each lot sized start.

(c) An initial capacitation check is done and if needed and possible, a start is moved earlier in time. This helps the implode by identifying opportunities for starting early.

(d) Establishes reverse low level code information to insure the heuristic implode step proceeds in the appropriate order. Reverse low level code information establishes the order in which parts must be processed by the heuristic implode step and is essentially the reverse order in which an MRP would process. For purposes of further discussion, we define a part number to have a reverse low level code of one if it has no components. The next steps in the BCD engine permit the user to modify STARTS, RECEIPTS, and CAPACITY AVAILABLE prior to executing the forward or implode component which generates the feasible schedule, plan, or match.

One output from the BCD MRP block 202 is the required capacity at block 206 to meet all demands. One of the asset files in the production and distribution planning information block 203 is a list of current available capacity. This file is called the CAPAVAIL file. The user can, if he or she desires, modify or adjust (step 2c in block 209) the projected date for any or all of the items in the receipts file. The user may do this manually or invoke a program that deploys advanced logic from expert systems to operations research to make these adjustments. After the adjustments are made the revised capacity available (CAPAVAIL) file is created in block 212 and made available for the implode component of the BCD engine. Step 2c of block 209 is optional.

A second output from the BCD MRP block 202 is the establishment of a need date in block 207 for each receipt. One of the asset files in the production and distribution planning information in block 203 is a list of all active work units in manufacturing and a projected date when work unit will come to stock. This file is called the Receipts file. The MRP calculates a need date for each work unit. The user can, if he or she desires, modify or adjust (step 2b in block 210) the projected date for any or all of the items in the receipts file. The user may do this manually or invoke a program that deploys advanced logic from expert systems to operations research to make these adjustments. After the adjustments are made the revised receipts file is created in block 213 and made available for the implode component of the BCD engine. Step 2b of block 210 is also optional.

A third output from the BCD MRP block 202 is the establishment of a list of the required starts (part identification, quantity, start date, and priority) for parts which have no further bill of material; that is, having reverse low level code of one in block 208. These are traditionally called STARTS in the microelectronics and related manufacturing industries and are often, but not always, wafers. A wafer is the starting point for the production of chips or other devices. We call this file in block 208 the STARTS file. As with the receipts file, the user can, if he or she desired, modify or adjust (step 2a in block 211) the start date for any or all of the items in the STARTS file. The user may do this manually or invoke a program that deploys advanced logic from expert systems to operations research to make these adjustments. After the adjustments are made the revised STARTS file is created in block 214 and made available for the implode component of the BCD engine. Step 2a in block 211 is also optional.

The user is now ready to move to step 3 in block 215 and invoke the implode component which creates the best can do (BCD) matching solution. The user has the option to select from two implode solvers. Option A in block 216 is based on heuristic decision technology. Option B in block 217 is based on linear programming (LP) decision technology. The revised STARTS file from block 214, revised receipts file from block 213, and revised capacity available file from block 212, input production and distribution information files from block 203, and date information from block 204 are used by both implode solvers. CLUES from block 205 are used only by option A (heuristic technology in block 216). Demands with priorities from block 201 are used only by option B (LP technology in block 217). The reader should note the demand block 201 is provided in both the lower left hand corner and the upper right hand corner of FIG. 2 to make the figure easier to follow.

The user is provided simple and synchronized access to both implode solvers of the BCD tool because the two different decision technologies have different strengths and weaknesses. The LP based engine is capable of handling very complex trade-offs involving capacity, alternative bills of materials (BOMs), substitution, demand classes, and a on time delivery of product to deliver an "optimal" solution. However, to achieve this level of intelligence, the LP based engine may run slower than the user would prefer for large problems, can not solve problems beyond a certain size, typically employs a time aggregation strategy, and requires post processing to generate lot sized manufacturing activities. The heuristic based engine has no "practical" size limitation, typically runs much faster than the LP based engine, and handles lot sizing within the core algorithm. However, to achieve this speed, the heuristic based engine can handle only moderate levels of complex trade-offs, and its search engine is designed to find a feasible and reasonable solution, but not an optimal solution. Since both are provided within the same BCD tool, the user can effortlessly select the decision technology best suited for their matching situation.

Figure 6:
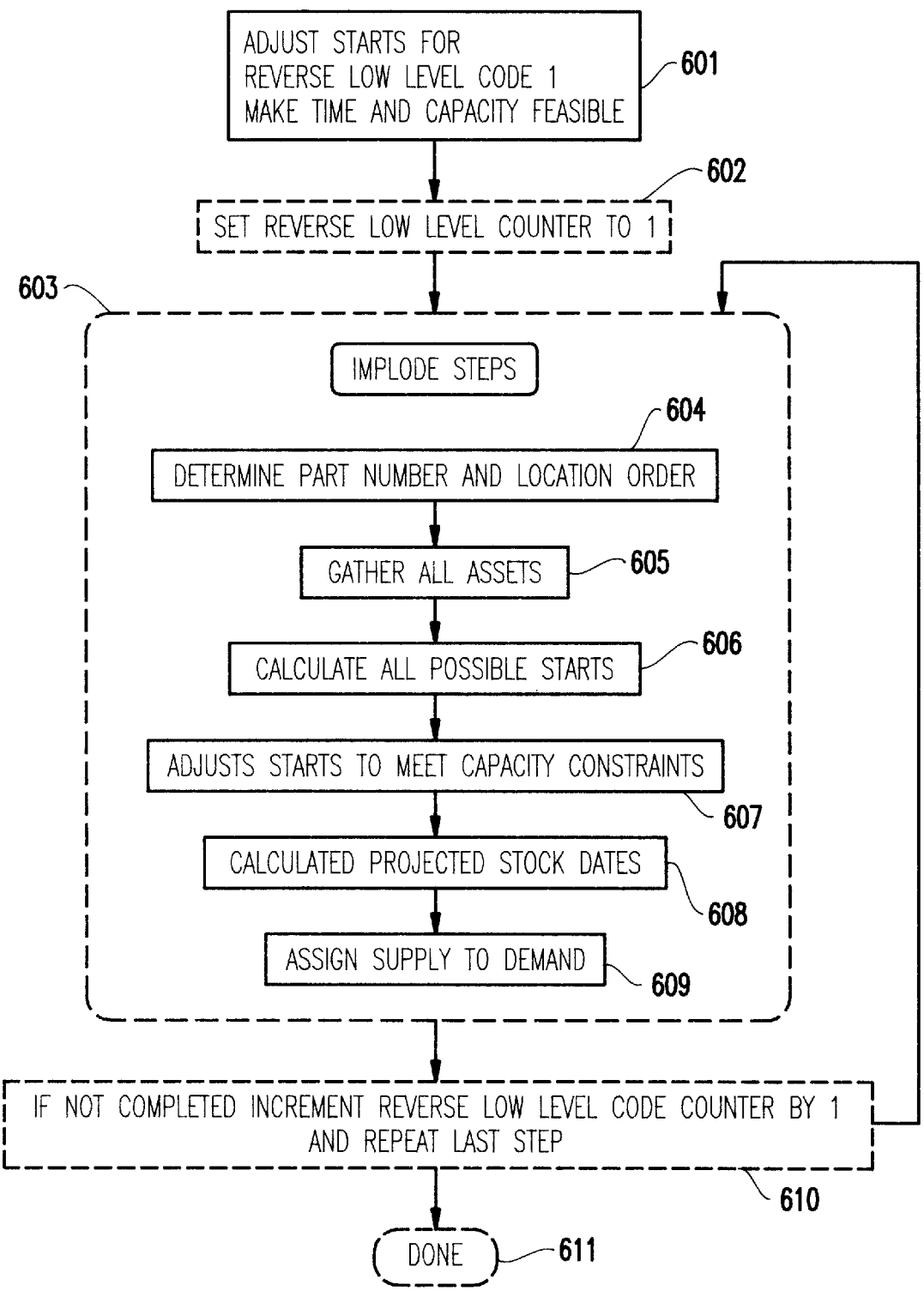
FIG. 6 is a flow diagram showing the overall flow of the heuristic implode component of the BCD.

The flow diagram of the heuristic implode solver 216 of the BCD tool is shown in FIG. 6 and works as follows. In block 601, the STARTS (manufacturing starts for part numbers with reverse low level code of one) are adjusted to be time and capacity feasible. Before entering the implode processing loop, the low level counter is set to one in block 602. All of the starts in the revised STARTS file are sorted by demand class, date, and part number. All starts having a start date in the past are changed to the user specified start date (block 204 in FIG. 2) for this execution of the BCD tool and the stock date (date when manufacturing activity is completed and part is available to meet demand) is recalculated. These revised STARTS are then examined to determine if capacity problems (not enough capacity) exist. If a problem is identified, then capacity is assigned to the starts on a first come first serve basis by demand class and date. That is, starts with the more important demand class have pre-emptive priority over starts with the less important demand class. If a start has to be adjusted (start date moved) to accommodate a capacity issue the solver first attempts to move the start earlier. If that is not possible, it will delay the start. The output of this step is an adjusted internal STARTS file that is capacity and time feasible for use in other heuristic implode steps.

In the implode processing loop block 603, the solver implodes part numbers for a specified reverse low level code. That is, for each part number, the assets against requested demand are calculated. This step is executed for each reverse low level code in order. In block 604, the tool identifies the order in which part numbers and locations must be processed. Locations which ship to other locations must process first. If part number substitutions have been made by the MRP, sort order is altered to ensure that within the same low level code part numbers that are substituting for other part(s) are processed before the part number(s) for which they are substituting. In block 605, all assets (inventory, receipts(WIP), purchases) are gathered. In block 606, all possible starts are calculated. This is done by using the starts from the STARTS file or calculating starts based on the availability of necessary components. Block 607 adjusts the starts for the part number to fit capacity constraints. If the start is not at the lowest reverse low level code it will pushed out in time (delayed). Block 608 calculates the projected to-stock date for the calculated starts. It is at this step adjustments are made for individual manufacturing facility shutdown days. If shutdown days were not used, this step would deploy calendar arithmetic well known to those practiced in the art to add the cycle time (number of days) to the start date to calculate the stock date. Within the heuristic, BCD logic is provided to delay the stock date to appropriately adjust for shutdown days. Techniques to adjust for shutdown dates are well known to those practiced in the art. Block 609 uses the demands from the MRP run to determine how supply will be given to customers or imploded further. Demands are to be covered on a first come first serve basis subject to demand class priorities. No supply beyond what is needed to cover MRP generated demand will be imploded forward. Block 609 covers demands on the part number with the assets gathered such that demand classes of higher priority have preference in shortage situations. Demands are covered in date order but demands of higher priority may preempt supply given out to demands of lesser priority. A test is made in block 610 to determine if the iterative process is done and, if not, the counter is incremented by one before looping back to the beginning of the implode processing loop. When the iteration is completed, the processing is completed. The iteration here insures demand classes of lower priority cannot impact the supply posture of demand classes of higher priority. Block 610 implodes supply to next level if its supply is covering an MRP exploded demand or MRP substitution or MRP transfer shipment.

The heuristic implode step will preserve MRP lot-sizing where possible but will give up lot-sizing in shortage conditions to more appropriately meet customer back orders. That is, if we have a demand for twenty-five pieces (which represents a lot-sized start at the next reverse level) and a supply of nineteen pieces available, it will supply the nineteen pieces when it can as opposed to waiting until a supply of twenty-five is available to keep lot-sizing at the next level intact.

Returning again to FIG. 2, the linear programming (LP) implode solver block 217 of the BCD tool works as follows. The center of any linear programming solver or model is not described by a solution process but by the equations that are its core. This is driven by the nature of the LP decision technology. In this technology, equations are created to represent the manufacturing process, business guidelines, and optimization criteria that drive the business function being modeled. The equations are the traditional form used to share and explain specific LP solvers among those practiced in the art. Each LP is solved by converting the equations into a data matrix, instantiating the data matrix with the values (yields, cycle times, conversion factors, demands, etc.) specific to the current problem of interest. In our case, these values lie in the files in blocks 201, 203, 204, 212, 213, and 214. The data matrix is then passed to an "LP solver engine", which searches the equations in data matrix form to generate a solution. There is a considerable body of knowledge about LP solver engines and a number of them are commercially available. The entire process of converting the equations into a data matrix, instantiating it with specific values, and passing this data matrix to a LP solver engine, and receiving a solution from the engine is well known to anyone practiced in the art. The preferred embodiment of our solution of the LP equations is the creation of a standard LP data matrix which is passed to the IBM product OSL (Optimization Subroutine Library) which solves the model for a given specification and reports back the BCD match or solution.

Figure 7:
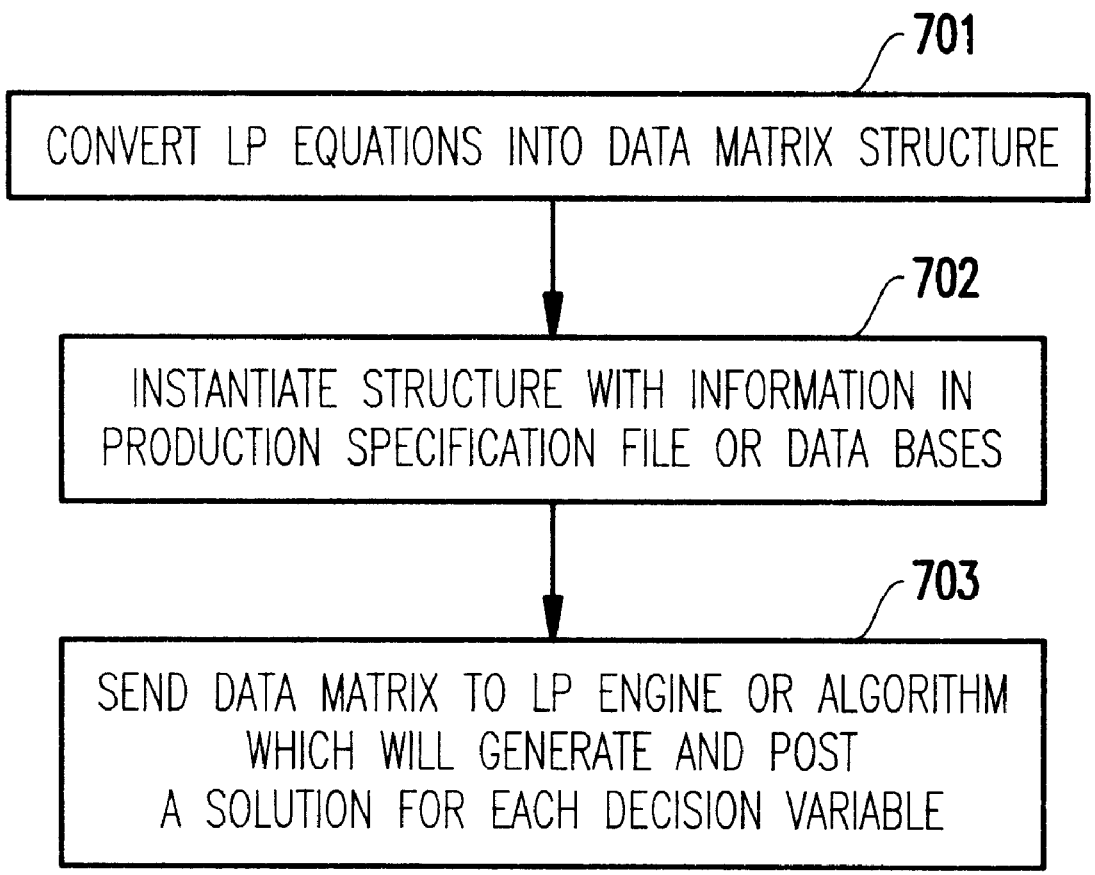
FIG. 7 is a flow diagram showing the overall flow of the Linear Programming (LP) implode component of the BCD.

FIG. 7 shows the overall solution of the LP implode solver of the BCD tool. The LP equations are first converted into a data matrix structure in block 701. The data matrix structure is instantiated with information in production specification file or data bases in block 702. The data matrix is then sent to the LP solver engine which generates and posts a solution for each decision variable in block 703.

Many of the core equations in the LP implode solver of the BCD tool are common to many applications of linear programming technology to production planning and are well known to those practiced in this art. They include:

(1) Material flow balance equations which as the "accountant" for the LP insuring the creation and use of all manufacturing activity are appropriately recorded and kept in balance.

(2) Capacity control equations which insure you do not exceed available capacity for manufacturing activities.

(3) Back order conservation which insures that demands that are not met or shipped on time are back ordered to be met at a future date.

However, some aspects of the objective function and the sourcing constraints are novel. The sourcing constraint equations enable users to control the deviation from targets about who should supply whom. The objective function minimizes total cost which consists of processing costs, shipping costs, back order cost by demand class, inventory holding cost, cost of deviating from sourcing objectives, and substitution costs.

The entire LP formulation is provided below in the form familiar to those practiced in the art; i.e., definition of subscripts, definition of objective function coefficients, definition of constants, definition of decision variables, LP formulation or equations.

Definition of Subscripts j—time period
m—material (part number)
a—plant location within the enterprise
n—material being substituted
z—group (which represents a family or collection of part numbers)
e—process (a method of purchasing or manufacturing a material at a plant)
v—receiving plant location
k—demand center (i.e., customer location) (Note: the set of customer locations is mutually exclusive from the set of plant locations)
q—demand class which indicates relative priority
w—resource capacity which could be a machine, labor hour, or other constraint
u—represents a consumer location which refers to an internal plant, external demand center, or to a generic indicator meaning any plant/or demand center

Definition of Objective Function Coefficients $PRC_{jmae}$—cost of releasing one piece of part m during period j at plant a using process e
$SUBC_{jmna}$—substitution cost per piece of part number n which is being substituted by part number m during period j at plant a
$TC_{jmav}$—transportation cost per piece of part number m leaving plant a during period j which are destined for plant v $INVC_{jma}$—inventory cost of holding one piece of a part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $SUB2C_{jmnak}$—substitution cost per piece of part number n which is being substituted by part number m during period j for shipments from plant a to satisfy demand at customer location k $BOC_{jmkq}$—backorder cost of one piece of part m at the end of period j for class q demand at customer location k

Definition of Constants $DEMAND_{jmkq}$—demand requested during time period j for part number m at customer location k for demand class q $RECEIPT_{jma}$—quantity of projected wip and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j $TT_{mav}$—transport time for part number m from plant a to plant v

Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u $S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules $Y_{jmnakq}$—Quantity of part number n which is being substituted by part number m during period j for shipments from plant a to satisfy class q demand at customer location k

LP Equations or Formulation

Minimizing the objective function:

$$\sum_j \sum_m \sum_a \sum_e PRC_{jmae} P_{jmae} + \sum_j \sum_m \sum_n \sum_a SUBC_{jmna} L_{jmna} +$$

$$\sum_j \sum_m \sum_a \sum_v TC_{jmav} T_{jmav} + \sum_j \sum_m \sum_a INVC_{jma} I_{jma} +$$

$$\sum_j \sum_z \sum_a \sum_u DMAXC_{jzau} S_{jzau} + \sum_j \sum_z \sum_a \sum_u DMINC_{jzau} G_{jzau} +$$

$$\sum_j \sum_m \sum_n \sum_a \sum_q \sum_k SUB2C_{jmnak} Y_{jmnaqk} +$$

$$\sum_j \sum_m \sum_k \sum_q BOC_{jmkq} B_{jmkq}$$

subject to the following constraint equations:

Sourcing Constraints $$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) + G_{jzau} \geq MINPCT_{jzau} H_{jzu}$$

Capacity Balance $$\sum_m \sum_e CAPREQ_{jmaew} P_{jmae} \leq CAPACITY_{jaw}$$

Backorder Conservation $$B_{jmkq} = B_{(j-1)mkq} + DEMAND_{jmkq} - \sum_n \sum_a Y_{jnmaqk} - \sum_a F_{jmakq}$$

Material Balance $$I_{jma} = I_{(j-1)ma} + RECEIPT_{jma} + \sum_{\substack{xs,t \\ x+CT_{xmae}=j}} \sum_e YIELD_{xmae} * P_{xmae} +$$

$$\sum_n \sum_a L_{jnma} + \sum_{\substack{xs,t \\ x+TT_{mav}=j}} \sum_a \sum_v T_{xmva} -$$

$$\sum_n \sum_a SUBQTY_{jmna} * L_{jmna} - \sum_v \sum_a T_{jmav} - \sum_k \sum_q F_{jmakq} -$$

-continued $$\sum_n \sum_k \sum_q Y_{jmnakq} - \sum_{\substack{nst,m\, is \\ a \\ component \\ of\, n}} \sum_e QTYPER_{jmaen} P_{jnae}$$

Non-Negativity All $X_{i,j\ldots} \geq 0$, where X is a generic decision variable and i,j represent generic subscripts.

There are number of aspects of the BCD implode component LP based solver which are novel and substantial improvements to current practice. They include, but are not limited to:

(1) The option to limit new manufacturing starts for parts with reverse low level code of 1 to those provided in the STARTS file.

(2) The option to insure a fixed ratio of production starts.

(3) The option to control sourcing between manufacturing locations.

(4) The option to control substitution at the customer, part number, demand class, and time bucket level.

(5) The ability to assign a specific demand class from one of many classes to demands at the customer, part number, and time bucket level with the ability to control trade-offs in on-time delivery between classes of demand.

(6) Enhanced time bucket controls which permit the user to define variable length time buckets, to turn on and off production splitting, and appropriately adjust the objective function to control for the unwanted side effects of overbuilding and late delivery. Each is described in more detail below.

Figure 8:
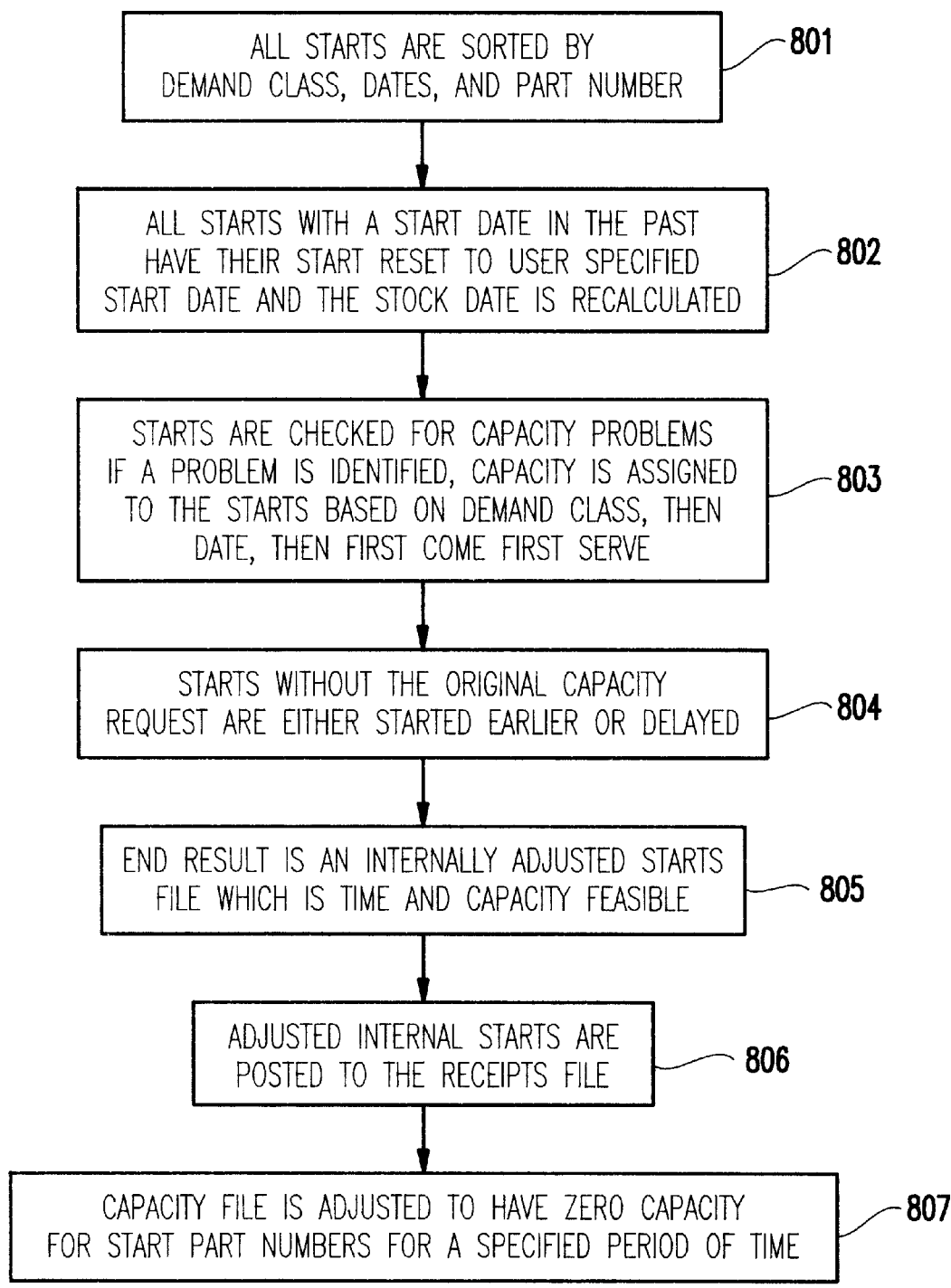
FIG. 8 is a flow diagram showing the overall flow of making starts an input to the LP model as opposed to a calculated value.

Traditionally, when linear programming (LP) decision technology is used to do matching, the model decides how many STARTS (starts for reverse low level code of one) are needed and when. The user of this BCD LP based implode solver has the option to take that decision away from the LP solver and limit the LP based implode solver to only the STARTS specified in its file. FIG. 8 is a flow diagram of the steps required to accomplish this task. Most of the steps are the same start adjustment steps the heuristic implode solver uses. The process begins in block 801 where all of the starts in the revised STARTS file are sorted by demand class, date, and part number. In block 802, all starts having a start date in the past are changed to the user specified start date in block 204 (FIG. 2) and the stock date (date when manufacturing activity is completed and part is available to meet demand) is recalculated. These revised STARTS are then examined in block 803 to determine if capacity problems (not enough capacity) exist. If a problem is identified, then capacity is assigned to the starts on a first come first serve basis by demand class and date. That is, starts with the more important demand class have a pre-emptive priority over starts with the less important demand class. If a start has to be adjusted (start date moved) to accommodate a capacity issue the solver first attempts to move the start earlier, but if that is not possible it will delay the start, as shown in block 804. The output of this step is an adjusted internal STARTS file in block 805 that is capacity and time feasible for use in the LP model. Then the STARTS are posted in block 806 as receipts or projected WIP in the RECEIPTS file, and the capacity available for all manufacturing activities which produce START parts is set to zero for a specified period of time in block 807.

At times, a user may need to split production across two manufacturing processes that make the same part according to a fixed ratio. For example, manufacturing process $MP_1$ and $MP_2$ both make part number 111 and 40% of all required production of part number 111 must be done by process $MP_1$, and the remaining 60% of required production of part number 111 must be accomplished by process $MP_2$. The total required production is unknown when the LP based implode solver begins and is determined by the solver. To insure this requirement or constraint is incorporated into the solution, the LP based implode solver generates the following two capacity constraints implemented within the model structure to ensure that the production of $MP_1$ is 40% of the total production for part 111.

$P_{111,mp1}$—is the production starts for part 111 at manufacturing process MP1

$P_{111,mp2}$—is the production starts for part 111 at manufacturing process MP2

$$-0.60 P_{111,mp1} + 0.40 P_{111,mp2} \leq 0$$
$$0.60 P_{111,mp1} + -0.40 P_{111,mp2} \leq 0$$

The generalization to more than two processes is obvious to anyone well practiced in the art.

The sourcing equations found in the detailed description of the LP model or equations within the LP based implode solver provided earlier permits the user to control how much supply a location receives from each manufacturing plant or distribution center by part number by time bucket. The user inputs relative preferences based on the intangible information he or she has which would be otherwise difficult to quantify. He or she may specify:

(1) A lower and upper limit of portion of supply to be supplied by specified supplying locations on a percentage basis.

(2) A penalty indicating the importance of following the sourcing guideline relative to the importance of avoiding substitutions, back orders, extra processing, extra shipments, etc.

(3) The consuming location as a plant location within the enterprise, a customer demand location, or blank which would indicate the sourcing guideline applies to all plants/demand centers receiving the supply.

(4) Manufacturing plants and distribution centers as supplying locations.

The substitution structures found in the detailed description of the LP model or equations within the LP based implode solver provided earlier enable the user to control substitutions at the part number, customer, demand class, and time bucket level.

The demand class structures found in the detailed description of the LP model or equations within the LP based implode solver provided earlier enable the user to control tradeoffs in the quantity of the tardiness and the importance of the demand. In previous LP modeling of demand classes, the approach used was to solve a series of Linear Programs, one for each demand class. This approach requires each demand class, X, to take absolute priority over demand class, Y, where X is a number lexicographically lower than Y. This approach does not permit the user to make tradeoffs between satisfying demands of varying classes. For instance, we may be willing to incur an additional ten pieces of demand class X back orders if so doing allows us to avoid fifty pieces of demand class Y back orders. The implode LP provides the user this flexibility. We model this by having an LP objective which minimizes the total number of weighted back orders. Since the weights are determined by demand class, the LP inherently allows tradeoffs to be made between satisfying demands of varying classes.

The size of the LP model is based on the number of parts and manufacturing activities and the number of days or more generally time buckets covered. As these grow eventually the LP takes a long time to solve or can not be solved at all due to current hardware limitations. The LP based implode solver permits the user to dynamically create time buckets he/she has specified. This is best illustrated with the following example.

If the model covers ten days, the user could choose to run with three time buckets. The first two time buckets would each be three days long and the third time bucket would be four days long. Now, the number of time units the LP must handle has been reduced from ten to three. In summary, for our example the time bucket information is:

Number of Days in the Model: 10
Number of Time Buckets: 3
Length of each Time Bucket: 3, 3, 4

However, the LP based implode solver must now spread or split completion of the parts across multiple time buckets. The following example will illustrate "splitting":

| Day | 1 | 2 | 3 | 4 | 5 | 6 | 7 | 8 | 9 | 10 |
|---|---|---|---|---|---|---|---|---|---|---|
| bucket the day is in | 1 | 1 | 1 | 2 | 2 | 2 | 3 | 3 | 3 | 3 |

This table demonstrates the assignment of each day within the model horizon to one time bucket. Days 1–3 belong to time bucket 1. Days 4–6 belong to time bucket 2. Days 7–10 belong to time bucket 3.

Assume we plan to start fifteen units in production time bucket 1. The first question is which day(s) in time bucket 1 will the production start? The LP based implode solver assumes the production will be started uniformly ("evenly") across each day in the bucket. Therefore five units will start on day 1, five units on day 2, and five units on day 3.

| Day | 1 | 2 | 3 | 4 | 5 | 6 | 7 | 8 | 9 | 10 |
|---|---|---|---|---|---|---|---|---|---|---|
| bucket the day is in | 1 | 1 | 1 | 2 | 2 | 2 | 3 | 3 | 3 | 3 |
| production starts | 5 | 5 | 5 | | | | | | | |

If the cycle time is four days, in which time bucket(s) will the parts come to stock and be available to meet independent or dependent demands? The starts on day 1 will be available at the beginning of day 5. This is calculated by adding 4 to the sequence number associated with the day (1+4). Day 5 is in time bucket 2. Therefore, its cycle time in time bucket form is 1 time bucket (time bucket 2–time bucket 1). The starts on day 2 will be available on day 6, which is in time bucket 2. Its cycle time is one time bucket. The starts on day 3 will be available on day 7 (time bucket 3). Therefore, its cycle time in time bucket form is two (time bucket 3–time bucket 1).

| Day | 1 | 2 | 3 | 4 | 5 | 6 | 7 | 8 | 9 | 10 |
|---|---|---|---|---|---|---|---|---|---|---|
| bucket the day is in | 1 | 1 | 1 | 2 | 2 | 2 | 3 | 3 | 3 | 3 |
| production starts/ | 5 | | | | | 5 | | | | |
| stock of 15 for time bucket 1 | | 5 | | | | | 5 | | | |
| | | | 5 | | | | | 5 | | |

To accommodate the splitting across time buckets of the completion of the parts the LP implode solver identifies for each manufacturing activity and for each time bucket a "completion" fraction. In the example provide above for starts made in time bucket 1 for part XXX, the completion fraction for time bucket 2 is 0.666667 and the fraction for time bucket 3 is 0.333333. The fraction for all other time buckets is 0.

The core algorithm to implement this approach is simply for each start date in a given period p1:

(1) Calculate the stock date according to cycle time and shutdown dates.
(2) Find the time period the stock date is in, say p2.
(3) The new cycle time regarding to time periods will be new_ct=p2−p1.
(4) Split the time period by grouping dates according to its new_ct.

Due to the dynamic nature of the splitting, the actual splitting is typically not implemented in the core equations, but occurs when the data matrix is instantiated just prior to sending it to the actual LP solver engine. This process is known to those well practiced in the art and results in a minor modification to the data matrix representation of the material balance equation.

Time buckets create a number of unwanted side effects. The LP based implode solver within the implode component of the BCD solver provides users unique capabilities to overcome two of the unwanted side effects of overbuilding at the end of the time horizon of the model and "late" delivery.

The following example will illustrate how overbuilding is resolved. We will continue with the ten day three time bucket example provided earlier. For this example we will assume the cycle time for part 222 is five days and production starts in time bucket 2.

| Day | 1 | 2 | 3 | 4 | 5 | 6 | 7 | 8 | 9 | 10 | 11-? |
|---|---|---|---|---|---|---|---|---|---|---|---|
| bucket the day is in | 1 | 1 | 1 | 2 | 2 | 2 | 3 | 3 | 3 | 3 | 4 |
| production starts/ | | | | | 5 | | | | 5 | | |
| stock of 15 for time bucket 2 | | | | | | 5 | | | | 5 | |
| | | | | | | | | 5 | | | 5 |

The starts on day 4 will be available at the beginning of day 9. This is calculated by adding five to the sequence number associated with the day (4+5). Day 9 is in time bucket 3. Therefore, its cycle time in time bucket form is one (time bucket 3–time bucket 2). The starts on day 5 will be available on day 10 which is in time bucket 3. Its time bucket cycle time is one. The starts on day 6 will be available on day 11. However, there is no day 11 in this model. A time bucket 4 is automatically created when the data matrix is instantiated which covers all days outside the time horizon. In our example, this is days 11 to infinity. Therefore, its cycle time is 4 (time bucket 4–time bucket 2). The split fraction is 0.67 (2/3) for a cycle time of 1 and 0.33 (1/3) for a cycle time of 2.

Now assume the only demand for part 222 is twenty units in time bucket 3 and there is no inventory or planned receipts to meet this demand. Without other guidance the LP implode solver will start thirty units of production in time bucket 2 to meet this demand. This will result in twenty units of part 222 coming to stock in time bucket 3 (2/3×30) to meet the demand and ten units coming to stock in time bucket 4 for which there is no demand. Hence, the over production of ten units.

The over production can be eliminated by starting twenty units in time bucket 1. This results in the units of part 222 coming to stock in time bucket 2 and time bucket 3 to meet the twenty units of demand in time bucket 3. The LP based implode solver will select this option if a large value is assigned to the inventory penalty objective function coefficient ($INVC_{jma}$) for part 222 in time bucket 4. The inventory coefficient and the objective function were described in detail earlier.

An alternative approach is to turn "rsplitting" off for selected parts and time buckets. In this option the time bucket with the largest fraction is set to one and all others are set to zero. In our first example the fraction for time bucket 2 is set to one. In the current example, the fraction for time bucket 3 is set to one and the fraction for time bucket 4 is set to zero. With this approach, all production begun in time bucket 2 for part 222 will come to stock in time bucket 3.

The unwanted side effect called late delivery is best explained with the following example. In this example, we have eleven days in the model horizon and time buckets of sizes 1, 1, 1, 2, 3, and 3. If the cycle time for part 333 is five days, then production started in time bucket 1 (day 1), 2 (day 2), and 3 (day 3) will all come to stock in time bucket 5 (days 6, 7, and 8).

| Day | 1 | 2 | 3 | 4 | 5 | 6 | 7 | 8 | 9 | 10 | 11 |
|---|---|---|---|---|---|---|---|---|---|---|---|
| bucket the day is in | 1 | 2 | 3 | 4 | 4 | 5 | 5 | 5 | 6 | 6 | 6 |
| production starts/ | 10 | | | | 10 | | | | | | |
| stock of 15 | | 10 | | | | | 10 | | | | |
| for time bucket 2 | | | 10 | | | | | 10 | | | |

Therefore, if there is demand for ten units of part 333 in time bucket 5, the LP model would traditionally always start production in time bucket 3 to meets its objectives to start new production as late as possible. However, the demand may actually be required on day 6, not day 8, and therefore the traditional approach results in late deliveries. Therefore, the safe approach would be to always start production for demand for part 333 in time bucket 5 during time bucket 1. This is the earliest time bucket which results in production coming to stock in that time bucket.

The unwanted side effect can be supplanted by the preferred production start decision by simply adjusting the cost objective coefficient ($PRC_{jmae}$) such that the cost of production is higher for starts of part 333 in time buckets 2 and 3 than in time bucket 1. The cost coefficient and the objective function were described in detail earlier.

The last step, step 4 of block 219 in FIG. 2, in the BCD tool is the conversion of the best can do matching solution or answer from block 218 into a pegging or a detailed supply chain analysis report in block 220. The conversion of the BCD answer from which demands can be met in what time frame and what manufacturing activities need to be executed at what time to a full supply chain explanation of the solution is of major benefit to the users and unique to this BCD. The report in block 220 shows the details of any customer order with respect to the part, and then the recommended shipment schedule, if any, as a result of the latest BCD run. The shipment schedule is followed by a series of supply chain information leading to the shipment schedule. The supply chain information include part (component) numbers, date the(independent or dependent) demand for a part (component) is satisfied, how and how much of the demand is satisfied (e.g., from inventory, future receipts, intersite shipments, vendor shipments, substitutions, or production starts).

The user selects the customer orders of interest. The report then shows the user how, when, and how much the parts and the associated components (which are defined in the BOM file) are produced, purchased from outside vendors, substituted by other parts, or simply removed from inventory to satisfy the specific demand. The report traces how a demand order is satisfied and enables a user to take the appropriate actions.

Figure 9:
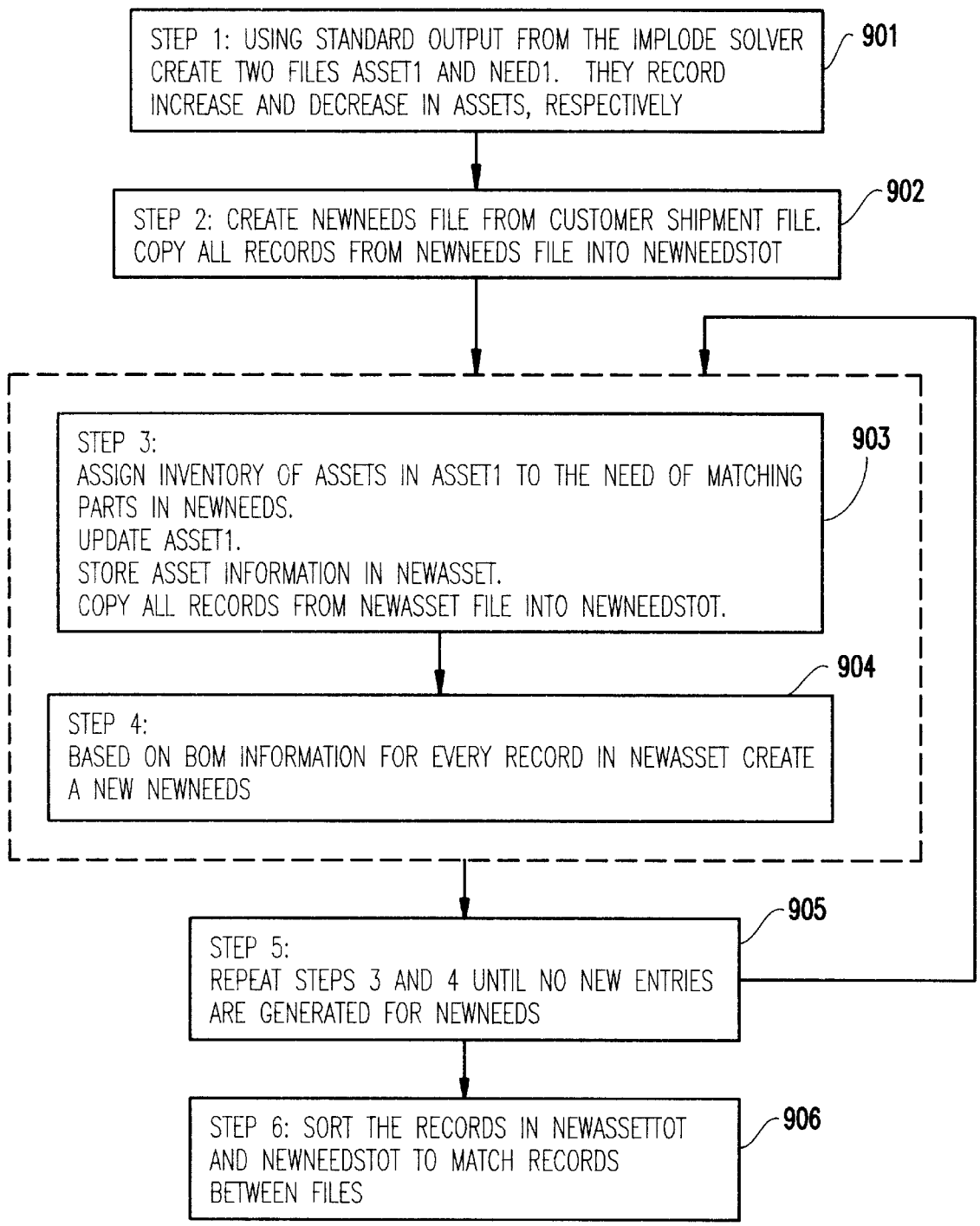
FIG. 9 is a flow diagram showing the overall flow of the creation of the supply chain analysis report from the BCD solution provided by the implode component.

Referring to the flow diagram of FIG. 9, the supply chain report is created in the following process. In block 901, the standard output from the implode solver is used to create two files called ASSET-1 and NEED-1. The asset file stores the information indicating any increase in an asset which occurs when a scheduled production or start comes to stock (completed). The need file records any decrease in an asset which occurs when an asset is allocated to meet a demand for that asset. In block 902, the customer shipment schedule which is a standard solver output file is converted into a NEWNEEDS file, and all records in NEWNEEDS are copied into a file called NEWNEEDSTOT. In block 903, inventory of assets (parts) in ASSET-1 are assigned to the need of matching parts in the NEWNEEDS file on a first-in, first-out (FIFO) basis. Update the parts inventory in ASSET-1 according to the assignment. The asset information is stored in a new asset file called NEWASSET, and all records in NEWASSET are copied to a file called NEWASSETTOT. Based on the BOM information for every asset record in NEWASSET, a new need file called NEWNEEDS is created in block 904. For example, an asset in NEWASSET may come from a production start. The production start may be translated into needs for components of the production starts using BOM information. A determination is made in block 905 as to whether all new entries have been processed. If not, the process loops back to block 903 and processing continues until no new entries are generated for the NEWNEEDS file. That is, we have considered and analyzed all components and subcomponents in the supply chain of all customer orders. When processing is complete, the records in NEWASSETTOT and NEWNEEDSTOT are sorted in a proper order in block 906 so the a record in NEWNEEDSTOT may find one or many matching records in NEWASSETTOT.

One of the key advances in the BCD tool is the ability of the user to dynamically personalize the BCD to best meet the needs of the business situation he/she is presently responsible. Below are five example scenarios based on FIG. 2.

Figure 10:
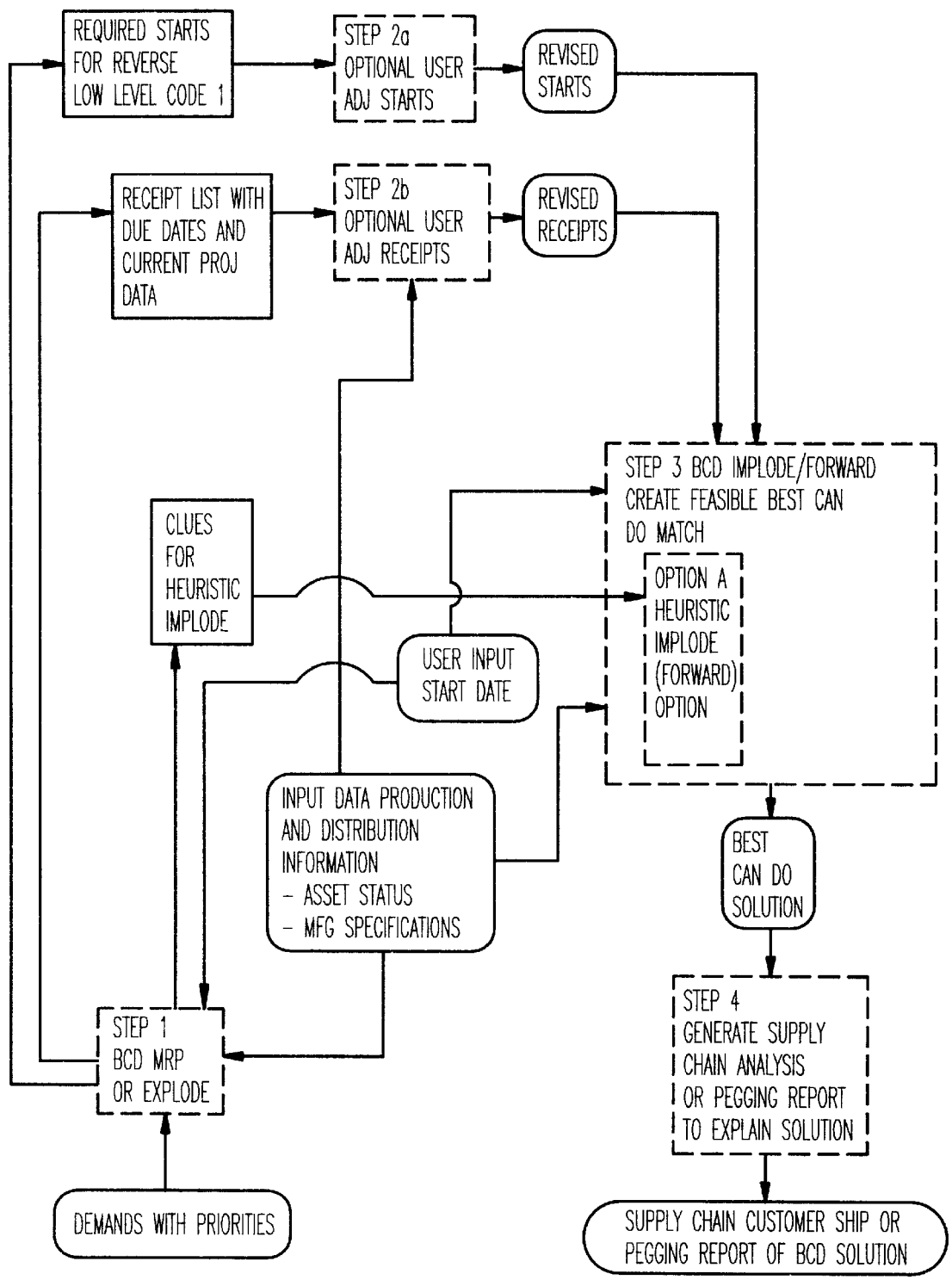
FIG. 10 is a flow diagram showing the overall flow of the BCD tool when only the heuristic implode process is used.

Scenario 1 is represented in FIG. 10. In this scenario the user exercises all three major stages (backwards (explode), adjustment, and forward (implode) of the BCD tool), but only uses the heuristic implode component. He or she does not use the LP implode component. Additionally, he or she does not use the adjust capacity step (step 2c in block 209 of FIG. 2). A user would select this scenario if he or she had a set of products with reasonably simple product structures and either many parts or many days in their planning horizon.

Figure 11:
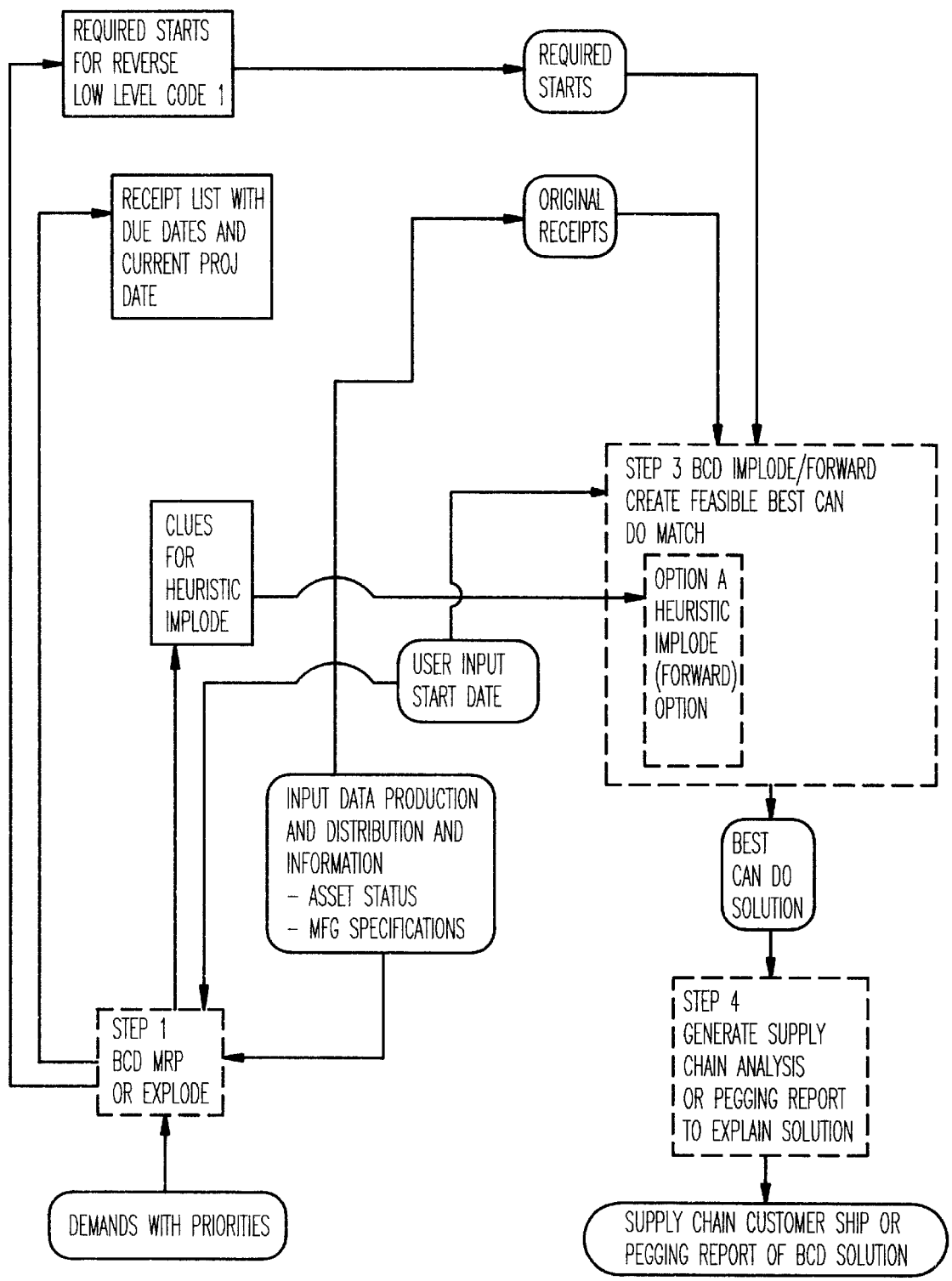
FIG. 11 is a flow diagram showing the overall flow of th BCD tool when no adjustment is made to the STARTS or the receipts files.

Scenario 2 is represented in FIG. 11. In this scenario, the user exercises two major components (explode and implode). He or she chooses not to make any adjustments to the STARTS file or the receipts file. In this scenario, the original receipts file in the input data is used without modification. The option to alter capacity is not made available to this user. This is a common scenario for runs on very large data sets.

Figure 12:
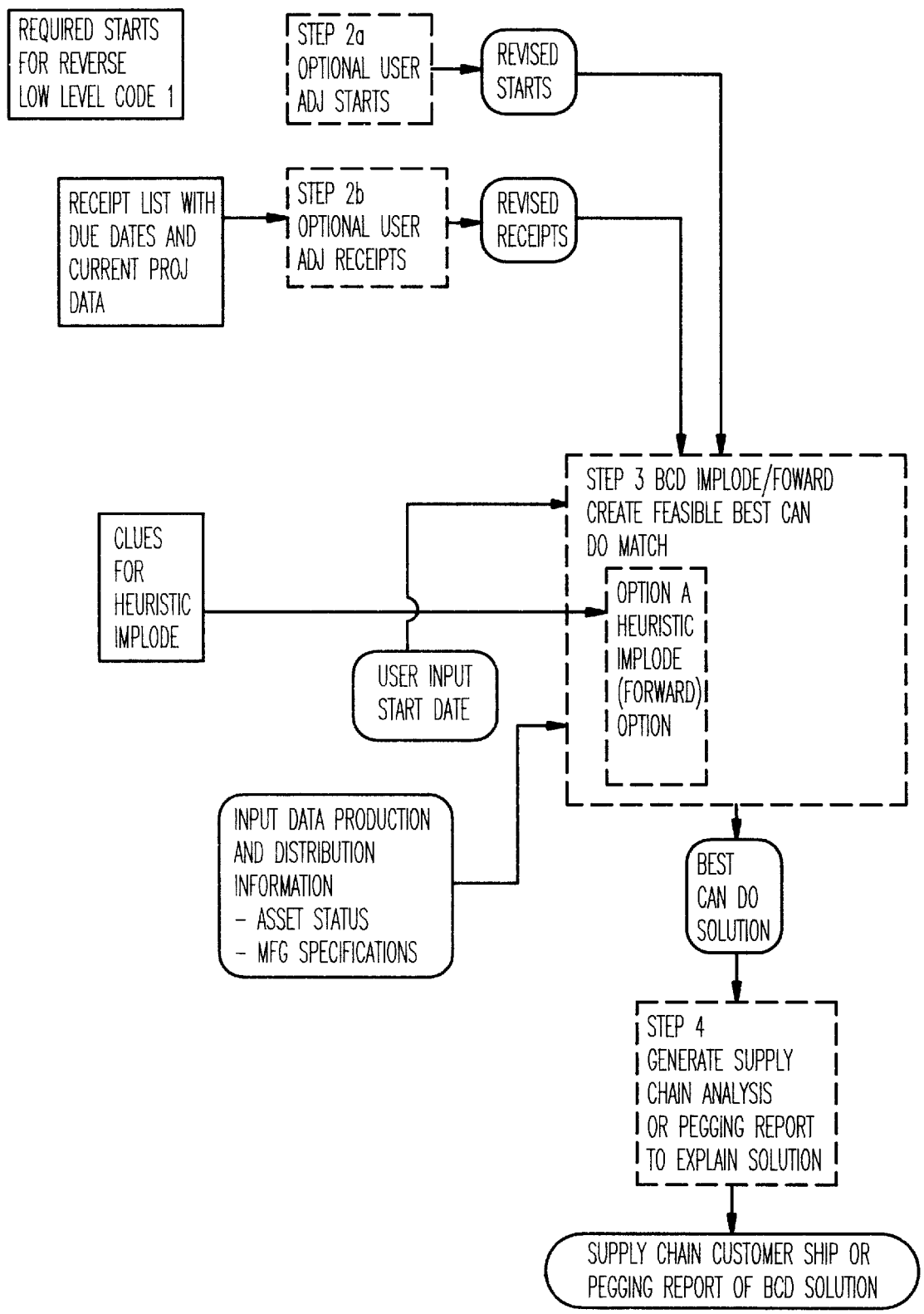
FIG. 12 is a flow diagram showing the overall flow of the BCD tool when the user is trying a set of "what-ifs" with different STARTS or receipts.

Scenario 3 is represented in FIG. 12. In this scenario, the user has run stage 1 (explode) and created and saved a required starts and receipts due date files and save. The user wishes to run a set of "what-if" scenarios with different adjusted STARTS and receipts. This is common practice when the production planning group is attempting to determine their START plan for a time unit (month, three months, etc.)

Figure 13:
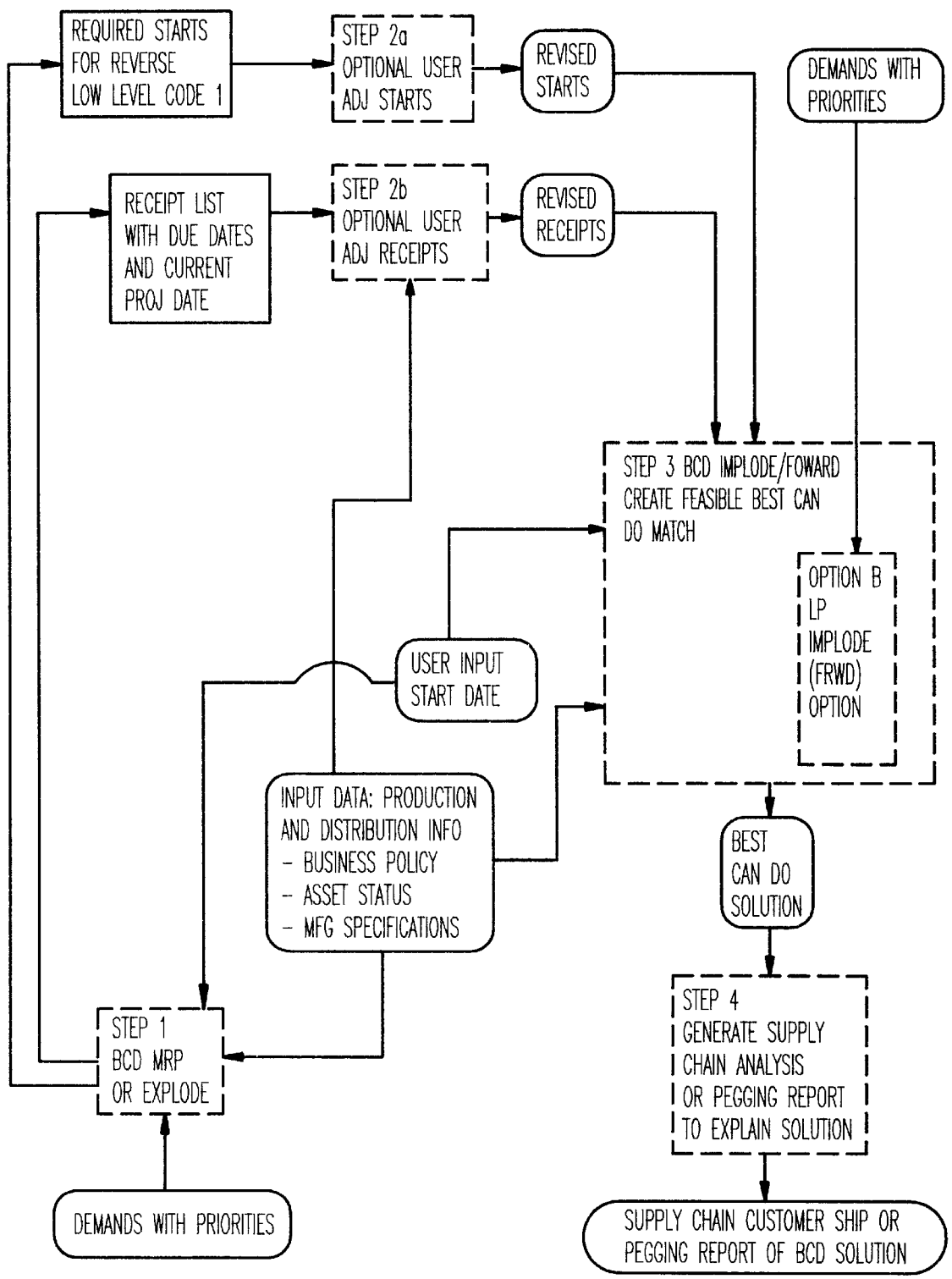
FIG. 13 is a flow diagram showing the overall flow of the BCD when only the LP implode component is selected.

Scenario 4 is represented in FIG. 13. In this scenario, the user exercises all three major stages, backwards (explode), adjustment, and forward (implode) of the BCD tool, but only uses the LP implode component. He or she does not use the heuristic implode component. Additionally, he or she does not use the adjust capacity step (step 2c in block 209 of FIG. 2). A user would select this scenario is they had a set of products with complex product structures (multiple processes and substitution) and either a reasonable number parts and/or time buckets.

Figure 14:
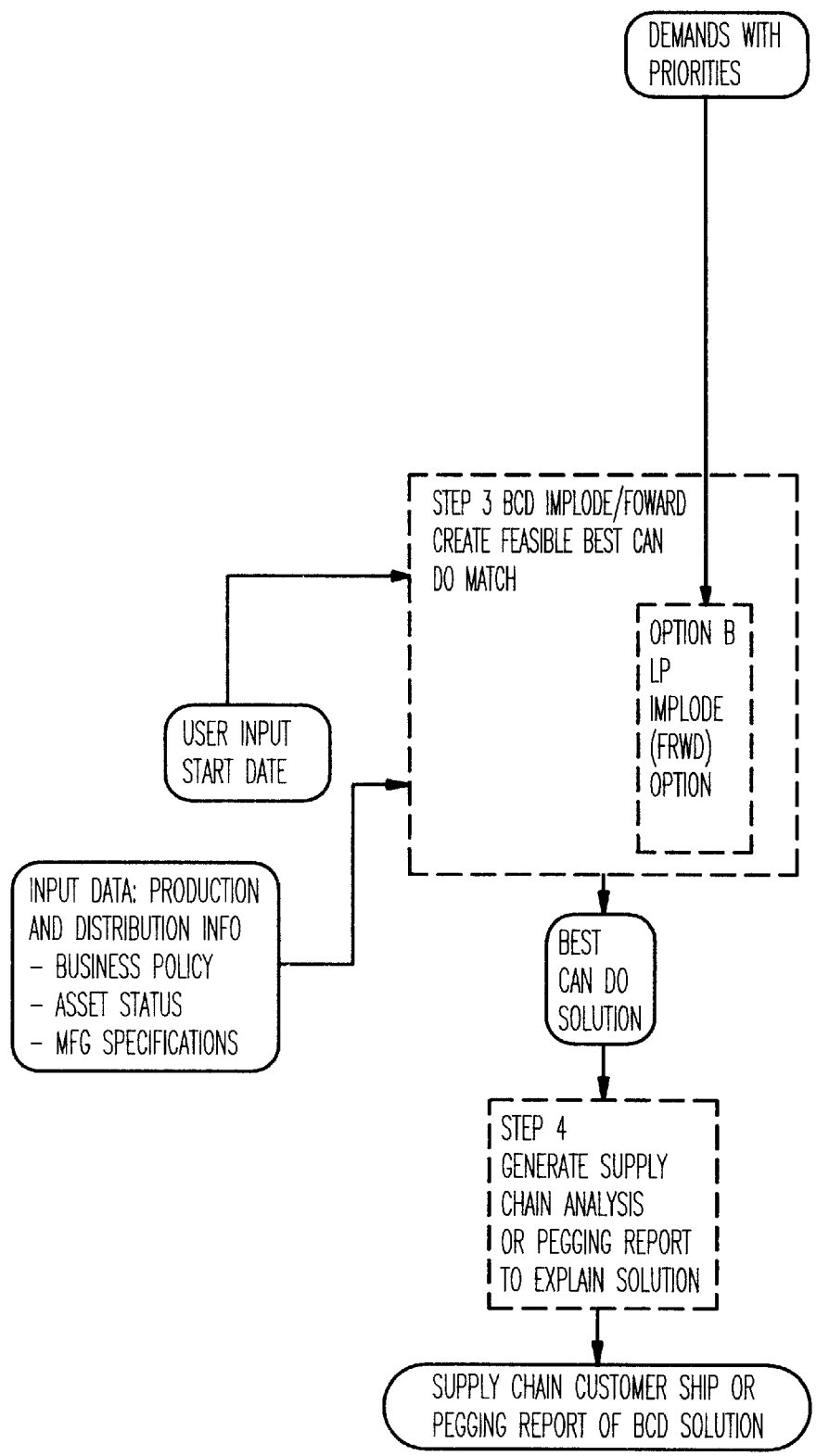
FIG. 14 is the flow diagram showing the overall flow of the BCD tool when the LP component is used in stand alone mode.

Scenario 5 is represented in FIG. 14. In this scenario, the user executes the LP implode engine in stand alone mode. The LP engine is capable of creating a feasible solution without a STARTS file and using the original receipts and capacity files in the input data (block 203 in FIG. 2).

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A computer implemented decision support method which intelligently matches assets with demand to create a best can do (BCD) match to determine which demands can be met in what time frame and identifies production necessary to meet demand comprising the steps of:
   inputting an input file of requested demands, including customer identification, type of part, quantity, date, and priority;
   receiving the input file and executing a BCD explosion component across multiple bills of material levels to create a required STARTS file for parts having no further bill of material (BOM), a file of work-in-progress (WIP) or receipts with need dates, a file of required capacity to meet demands, and clues for a BCD implode component;
   accessing the STARTS file, the WIP and receipts file and the required capacity file and executing the BCD implode component across multiple bills of material levels to create a match between assets and demands and hence a BCD solution; and
   generating a supply chain analysis report to explain the BCD solution that allows a user to trace how demand is satisfied across multiple bills of material levels.

2. The computer implemented decision support method recited in claim 1 wherein the BCD explode component comprises the steps of:
   backward exploding from independent demand through a bill of materials (BOM) one low level code at a time using material requirements planning (MRP) logic;
   keeping demand for each demand class separate and passing classification information backwards from independent demand through each level of dependent demand;
   executing a separate optimization for binned parts to minimize required starts;
   spreading starts to avoid capacity over utilization; and
   storing propagated demand class, need date, and required starts information for use by other component systems of the decision support method.

3. The computer implemented decision support method recited in claim 1 wherein prior to executing the BCD implode component, the method further comprises the steps of:
   adjusting the required STARTS file to modify start dates and/or quantity of one or more items in the STARTS file;
   adjusting the WIP file to modify projected date and/or quantity of one or more items in the WIP file; and
   allowing a user to adjust the capacity available file to modify projected available quantities.

4. The computer implemented decision support method recited in claim 3 wherein the method includes a user interactive component to permit the user to modify items in the STARTS file and further comprising the steps of:
   displaying recommended starts relative to available capacity; and
   receiving an input from a user modifying the starts.

5. The computer implemented decision support method recited in claim 3 wherein the method includes a user interactive component to permit the user to modify items in the STARTS file and further comprising the steps of:
   displaying recommended starts relative to a current business plan; and
   receiving an input from a user modifying the starts.

6. The computer implemented decision support method recited in claim 3 wherein the method includes a user interactive component to permit the user to modify items in the WIP file and further comprising the steps of:
   displaying current receipt date for each unit with the need date; and
   receiving an input from a user modifying the receipt date.

7. The computer implemented decision support method recited in claim 3 wherein the method includes a user interactive component to permit the user to modify items in the WIP file and further comprising the steps of:
   displaying current receipt date for each WIP unit with a current status of manufacturing; and
   receiving an input from a user modifying the receipt date.

8. The computer implemented decision support method recited in claim 3 wherein the method includes a user interactive component to permit the user to modify items in the capacity available file and further comprising the steps of:
   displaying current capacity available information for each of a plurality of time buckets and resources with a calculated capacity required; and
   receiving an input from a user modifying the capacity available information.

9. The computer implemented decision support method recited in claim 3 wherein the method includes a user interactive component to permit the user to modify items in the capacity available file and further comprising the steps of:

displaying current capacity available information with a current status of manufacturing; and receiving an input from a user modifying the capacity available information.

10. The computer implemented decision support method recited in claim 1 including a BCD supply chain analysis reporting component comprising the steps of:

determining all increases and decreases in assets from implode solution files;

creating a needs file from a customer shipment file;

assigning assets to meet needs;

determining component needs from the BOM information;

assigning assets to the component needs; and sorting the assets and needs files to match logically connected records.

11. The computer implemented decision support method recited in claim 1 wherein the BCD implode component comprises the steps of:

selecting between an implode solver based on heuristic decision technology or an implode solver based on linear programming (LP) technology; and executing the selected solver.

12. The computer implemented decision support method recited in claim 11 wherein said implode solver based on heuristic decision technology comprises the steps of:

sorting all starts by demand class, date, and part number;

resetting all starts having a start date prior to the user specified start date;

resetting starts to be capacity feasible by giving priority to starts on a first come, first served basis based on a pre-emptive priority of demand class and date;

imploding each part number in reverse low level code order where priority is given to locations which ship to other locations;

gathering all assets;

calculating all possible starts by examining the starts file and available components; and allocating supply to customers for further implosion based on demands and priorities established by the explode component.

13. The computer implemented decision support method recited in claim 12 wherein the implode solver based on heuristic decision technology further comprises the steps of:

adjusting starts for capacity considerations; and calculating a projected to-stock date appropriately accounting for shutdown days.

14. The computer implemented decision support method recited in claim 11 wherein said implode solver based on LP technology comprises the steps of:

resetting all starts having a start date in the past to a user specified start date;

resetting starts to be capacity feasible by giving priority to starts on a first come, first served basis based on a pre-emptive priority of demand and date;

adjusting cycle time information and calculating time bucket production split information for user specified time buckets so that the adjusted cycle time information and time bucket production split information may be fed into the implode solver based on LP technology;

creating a computational form of the equations in an LP model called an LP data matrix;

instantiating the LP data matrix with the current production specification information; and passing the instantiated LP data matrix to an LP solver and executing the LP solver to generate a BCD solution.

15. The computer implemented decision support method recited in claim 14 wherein said implode solver based on LP technology further comprises the steps of:

determining if the user is using a fixed starts option or an open starts option; and placing the starts as entries in the WIP and receipts file and adjusting capacity if the user has selected the fixed starts option.

16. The computer implemented decision support method recited in claim 15 wherein said implode solver based on LP technology further comprises the step of turning production splitting off if that option is requested by the user.

17. The computer implemented decision support method recited in claim 14 wherein said implode solver based on LP technology further comprises the step of adjusting an inventory holding cost objective function coefficient to eliminate unwanted time bucket side effect of overbuilding.

18. The computer implemented decision support method recited in claim 14 wherein said implode solver based on LP technology further comprises the step of adjusting a production cost objective function coefficient to eliminate unwanted time bucket side effect of late delivery.

19. The computer implemented decision support method recited in claim 14 wherein the equations in the LP model of said implode solver based on LP technology represent manufacturing specifications, business policies, and business guidelines and include material balance, capacity balance, capacity balance equations to insure fixed production ratios between multiple processes producing a same part is maintained, back order conservation, sourcing constraints which permits the user to control how much supply a location receives from each manufacturing plant or distribution center, a complex objective function which supports multiple demand classes, weighted trade-offs between demand classes, inventory holding cost coefficients to support trade-offs between on-time delivery and inventory, production cost coefficients to permit the user to specify the relative preference of production options, and the flexibility to specify objective function coefficients to offset the unwanted side effects of overbuilding and late delivery.

* * * * *